(12) United States Patent
Bodolec et al.

(10) Patent No.: US 11,119,568 B2
(45) Date of Patent: Sep. 14, 2021

(54) SUSPEND MODE FEATURE FOR ARTIFICIAL REALITY SYSTEMS

(71) Applicant: Facebook Technologies, LLC, Menlo Park, CA (US)

(72) Inventors: Arthur Bodolec, New York City, NY (US); Jing Shu, Sunnyvale, CA (US); Lindsay Young, San Francisco, CA (US); Melissa Erin Summers, Charlotte, NC (US); Andrea Zeller, Bothell, WA (US); Seohyun Lee, Mountain View, CA (US); Ayfer Gokalp, Kirkland, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/734,093

(22) Filed: Jan. 3, 2020

(65) Prior Publication Data

US 2021/0089117 A1 Mar. 25, 2021

Related U.S. Application Data

(60) Provisional application No. 62/905,098, filed on Sep. 24, 2019.

(51) Int. Cl.
| | | |
|---|---|---|
| *G06F 3/01* | (2006.01) | |
| *G09G 5/37* | (2006.01) | |
| *G09G 5/02* | (2006.01) | |
| *G06F 3/0484* | (2013.01) | |

(52) U.S. Cl.
CPC ............. *G06F 3/011* (2013.01); *G06F 3/017* (2013.01); *G06F 3/04842* (2013.01); *G09G 5/026* (2013.01); *G09G 5/37* (2013.01); *G09G 2354/00* (2013.01)

(58) Field of Classification Search
CPC ....................................................... G06F 3/011
See application file for complete search history.

(56) References Cited

U.S. PATENT DOCUMENTS

| | | | |
|---|---|---|---|
| 2017/0323489 A1* | 11/2017 | Clement | ................. G06T 13/40 |
| 2017/0326457 A1 | 11/2017 | Tilton et al. | |
| 2018/0095542 A1 | 4/2018 | Mallinson | |
| 2018/0157333 A1 | 6/2018 | Ross et al. | |

OTHER PUBLICATIONS

International Search Report and Written Opinion of International Application No. PCT/US2020/049282, dated Nov. 24, 2020, 9 pp.

* cited by examiner

*Primary Examiner* — Gustavo Polo
(74) *Attorney, Agent, or Firm* — Shumaker & Sieffert, P.A.

(57) ABSTRACT

In general, this disclosure describes a suspend mode feature for artificial reality systems and, more specifically, system configurations and techniques for generating a suspend mode environment during execution of an artificial reality application, and presenting and controlling user interface (UI) elements within the suspend mode environment. The suspend mode feature enables a user interacting with one or more other users (or one or more avatars corresponding to the one or more other users) within an artificial reality (AR) environment to suspend the AR environment from the user's perspective. While in the suspend mode environment, the user is able to view and select the other users from the AR environment. For example, the user may select another user to friend, message, mute, block, or report that user from the suspend mode environment.

20 Claims, 13 Drawing Sheets

SUSPEND MODE FEATURE FOR ARTIFICIAL REALITY SYSTEMS

This application claims the benefit of U.S. Provisional Patent Application No. 62/905,098, filed Sep. 24, 2019, the entire contents of which are incorporated herein by reference.

TECHNICAL FIELD

This disclosure generally relates to artificial reality systems, such as virtual reality, mixed reality and/or augmented reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include completely-generated content or generated content combined with captured content (e.g., real-world video and/or images). During operation, the user typically interacts with the artificial reality system to select content, launch an application or otherwise configure the system.

SUMMARY

In general, this disclosure describes a suspend mode feature for artificial reality systems. More specifically, this disclosure describes system configurations and techniques for generating a suspend mode environment during execution of an artificial reality application, and presenting and controlling user interface (UI) elements within the suspend mode environment. The suspend mode feature enables a user interacting with one or more other users (or one or more avatars corresponding to the one or more other users) within an artificial reality (AR) environment to suspend the AR environment from the user's perspective. While in the suspend mode environment, the user is able to view and select the other users from the AR environment. For example, the user may select another user to friend, message, mute, block, or report that user from the suspend mode environment.

In one or more example aspects, an artificial reality system includes a head-mounted display (HMD) configured to output artificial reality content to a user of the HMD, wherein the artificial reality content includes one or more avatars corresponding to one or more other users participating in an artificial reality environment; and a suspend mode engine configured to, in response to user input, enable a suspend mode environment for the user of the HMD, wherein the suspend mode engine at least one of replaces the artificial reality environment with the suspend mode environment at the HMD, mutes the one or more avatars and the artificial reality environment at the HMD, or renders the one or more avatars in static positions within the suspend mode environment.

In one or more further example aspects, a method including outputting, at a head mounted display (HMD) of an artificial reality system, artificial reality content to a user of the HMD, wherein the artificial reality content includes one or more avatars corresponding to one or more other users participating an artificial reality environment; and in response to user input, enabling a suspend mode environment for the user of the HMD by at least one of replace the artificial reality environment with the suspend mode environment at the HMD, muting the one or more avatars and the artificial reality environment at the HMD, or rending the one or more avatars in static positions within the suspend mode environment.

In one or more additional example aspects, computer-readable storage medium comprising instructions that configure one or more programmable processors to output, at head mounted display (HMD) of an artificial reality system, artificial reality content to a user of the HMD, wherein the artificial reality content includes one or more avatars corresponding to one or more other users participating an artificial reality environment; and in response to user input, enable a suspend mode environment by at least one of replacing the artificial reality environment with the suspend mode environment at the HMD, muting the one or more avatars and the artificial reality environment at the HMD, or rending the one or more avatars in static positions within the suspend mode environment.

The techniques may provide one or more technical improvements that provide at least one practical application. For example, the techniques enable a user to quickly enable a suspend mode at an HMD while continuing to receive data corresponding to an artificial reality environment and allowing other users to continue to participate in the artificial reality environment at other HMDs. By continuing to receive data corresponding to an artificial reality environment while other users continue to participate in the artificial reality environment at other HMDs, the HMD will not have a backlog of data updates to process when returning to the artificial reality environment from a suspend mode environment, which enables the user to more quickly return to participating in the artificial reality environment by reducing data processing delays for a more pleasing user experience.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
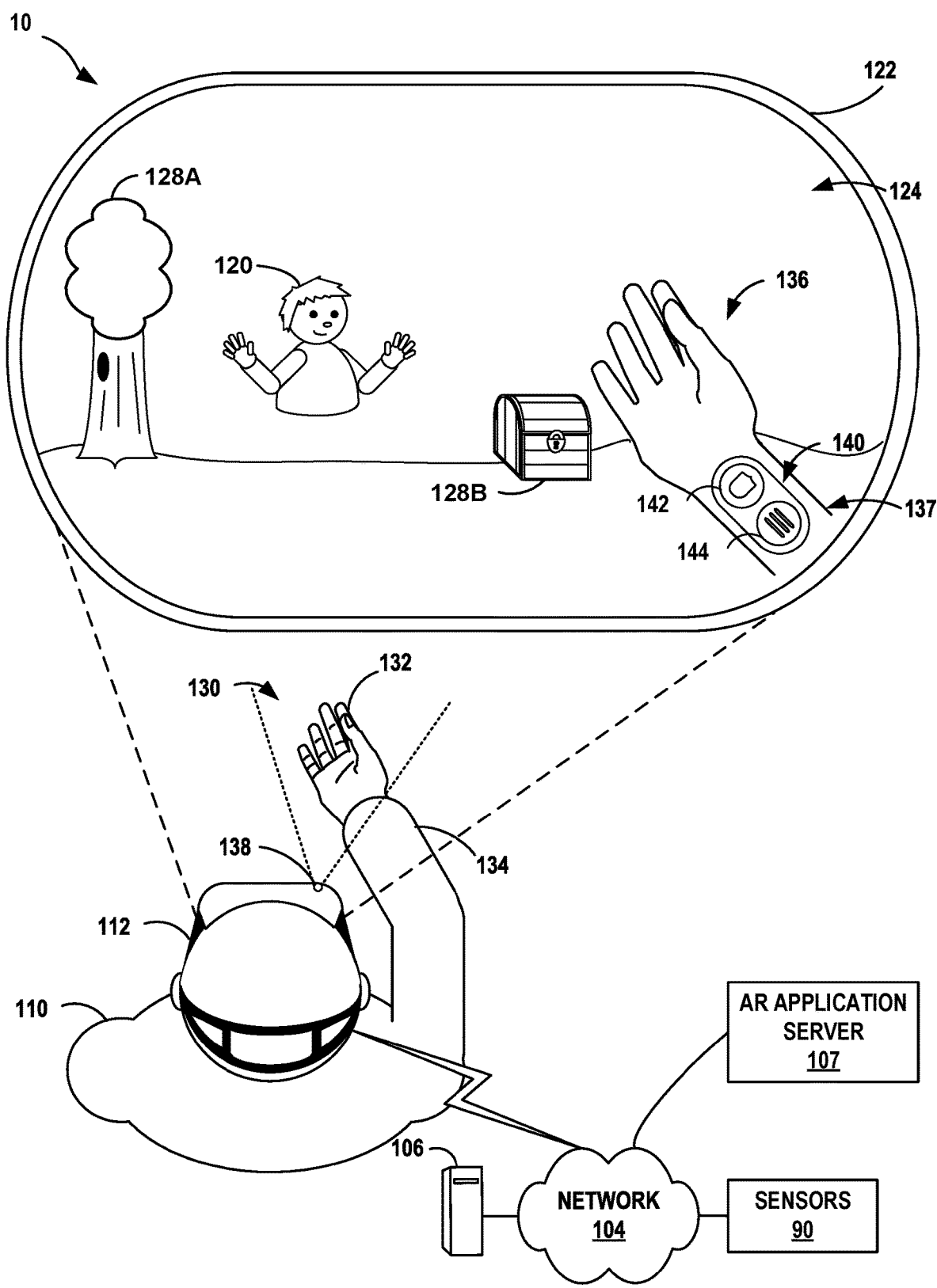
FIG. 1A is an illustration depicting an example artificial reality system having a suspend mode feature, in accordance with the techniques of the disclosure.

FIG. 1A is an illustration depicting an example artificial reality system 10 having a suspend mode feature, in accordance with the techniques of the disclosure. In some examples, the suspend mode feature may be referred to as a safe mode or safe zone feature. In the example of FIG. 1A, artificial reality (AR) system 10 includes head mounted device (HMD) 112, console 106, artificial reality application server 107, and, in some examples, one or more external sensors 90.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD and may include one or more image capture devices 138, e.g., cameras, line scanners and the like, for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as Wi-Fi, a mesh network or a short-range wireless communication medium. Although HMD 112 is shown in this example as in communication with, e.g., tethered to or in wireless communication with, console 106, in some implementations HMD 112 operates as a stand-alone, mobile artificial reality system.

In this example, HMD 112 is illustrated as being in communication, via network 104, with artificial reality application server 107, which performs backend network operations for an artificial reality application executing on console 106 and/or HMD 112. In some examples, artificial reality application server 107 may correspond to a server or another computing resource in any form. For example, artificial reality application server 107 may be a physical computing device or may be a component of a cloud computing system, server farm, and/or server cluster (or portion thereof). Accordingly, artificial reality application server 107 may represent one or more physical computing devices, virtual computing devices, virtual machines, containers, and/or other virtualized computing device that provides services to client devices and other devices or systems executing a particular artificial reality application. For example, artificial reality application server 107 may manage relationships between users (e.g., friendships), maintain profiles for users, coordinate games with one or more users (e.g., place one or more users in a game, maintain score), and so on.

In the example of FIG. 1A, user 110 views the artificial reality content 122 constructed and rendered by an artificial reality application executing on console 106 and/or HMD 112. In some examples, artificial reality system 10 uses information captured from a real-world, 3D physical environment to render artificial reality content 122 for display to user 110. As one example, artificial reality content 122 may be a consumer gaming application in which user 110 is rendered as an avatar including virtual hand 136 and virtual arm 137 within artificial reality environment 124. Artificial reality content 122 can also include one or more other users rendered as avatars 120 and one or more virtual objects 128A, 128B within the artificial reality environment 124. In some examples, artificial reality content 122 may comprise a mixture of real-world imagery and virtual objects, e.g., mixed reality and/or augmented reality. In other examples, artificial reality content 122 may be, e.g., a social networking application, a video conferencing application, a navigation application, an educational application, training or simulation applications, or other types of applications that implement artificial reality. In some examples, artificial reality content 122 may be rendered from a first person perspective relative to the avatar associated with the user of HMD 112.

During operation, an artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. In some examples, the artificial reality application may render images of real-world objects, such as the portions of hand 132 and/or arm 134 of user 110, that are within field of view 130 along with the virtual objects, such as within artificial reality content 122. In other examples, the artificial reality application may render virtual representations of the portions of hand 132 and/or arm 134 of user 110 that are within field of view 130 (e.g., render real-world objects as virtual objects such as virtual hand 136) within artificial reality content 122. In either example, user 110 is able to view the portions of their hand 132, arm 134, and/or any other real-world objects that are within field of view 130 within artificial reality content 122. In other examples, the artificial reality application may not render representations of the hand 132 or arm 134 of the user.

In some examples, based on sensed data, the artificial reality system 10 detects gestures performed by user 110 and, in response to detecting one or more particular gestures, generates one or more user interface elements which may be overlaid on underlying artificial reality content 122 being presented to user 110, such as user interface (UI) menu 140 in FIG. 1A. More specifically, artificial reality system 10 performs object recognition within image data captured by image capture devices 138 of HMD 112 to identify hand 132, including optionally identifying individual fingers or the thumb, and/or all or portions of arm 134 of user 110. Artificial reality system 10 tracks the position, orientation, and configuration of hand 132 (optionally including particular digits of the hand) and/or portions of arm 134 over a sliding window of time. The artificial reality system 10 analyzes any tracked motions, configurations, positions, and/or orientations of hand 132 and/or portions of arm 134 to identify one or more gestures performed by particular objects, e.g., hand 132 (including particular digits of the hand) and/or portions of arm 134 of user 110. To detect the gesture(s), the artificial reality application may compare the motions, configurations, positions and/or orientations of hand 132 and/or portions of arm 134 to gesture definitions stored in a gesture library of artificial reality system 10, where each gesture in the gesture library may be each mapped to one or more actions. In some examples, detecting movement may include tracking positions of one or more of the digits (individual fingers and thumb) of hand 132, including whether one or more digits are placed at an area corresponding to a virtual object (e.g., a UI element). In other examples, detecting movement may include tracking an orientation of hand 132 (e.g., fingers pointing toward HMD 112 or away from HMD 112) and/or an orientation of arm 134 (i.e., the normal of the arm facing toward HMD 112) relative to the current pose of HMD 112, including whether the inside wrist area of hand 132 is facing toward HMD 112. The position and orientation of hand 132 (or a portion thereof) may alternatively be referred to as the pose of hand 132 (or a portion thereof).

In accordance with techniques of this disclosure, artificial reality system 10 may suspend the AR environment from the perspective of user 110 and generate a suspend mode environment during execution of the artificial reality application in response to user 110 enabling the suspend mode feature at HMD 112. For example, the suspend mode feature may replace artificial reality environment 124 with the suspend mode environment in artificial reality content 122 and render one or more avatars from the artificial reality environment 124 in static positions at HMD 112 in response to user input selecting suspend mode UI element 142, as described in further detail below. User 110 may then select any avatar 120 present at the suspend mode environment to perform additional operations with respect to that user corresponding to the selected avatar, including viewing the user's profile, friend, message, mute, block, or report that user from the suspend mode environment. In some examples, artificial reality application server 107 performs artificial reality application backend-network operations to friend, message, block, or report a user from the suspend mode environment. For example, the artificial reality application may formulate instructions that are performed by the artificial reality application server 107 to obtain a profile, friend, message, mute, block, or report a user based on user input on a user interface presented to user 110 at HMD 112. In some examples, the suspend mode feature may replace an avatar of user 110 with a virtual graphic in artificial reality environment 124 while avatars 120 continue to participate artificial reality environment 124. In this way, avatars 120 may not interact with the avatar of HMD 112 (and vice versa) while the suspend mode feature is enabled at HMD 112. In some examples, the suspend mode environment may be referred to as a safe mode or safe zone environment.

In some examples, artificial reality system 10 may detect one or more UI activation gestures intended to trigger a desired response by the artificial reality application, such as triggering display of a UI element used to select the suspend mode environment and/or triggering execution of the suspend mode environment. For example, user 110 may move the inside wrist area of hand 132 into the current field of view 130 to trigger the display of UI menu 140 (e.g., a virtual icon) near or at least partially over virtual hand 136 and/or virtual arm 137. This UI activation gesture may be similar to a user looking at a wrist watch or any other wearable device. While FIG. 1A shows UI menu 140 displayed over the inside surface (e.g., the wrist area) of virtual arm 137, it should be understood that UI menu 140 may displayed near or partially over any surface(s) of virtual hand 136 and/or virtual arm 137.

As shown in FIG. 1A, UI menu 140 may include suspend mode UI element 142 that when selected enables the suspend mode feature and personal UI element 144 that when selected causes personal menu items to be displayed.

In some examples, the personal menu items displayed in response to user input selecting personal UI element 144 may include a settings UI element that when selected allows the user to change artificial reality application settings or preferences, a people UI element that when selected allows the user to view friends and/or the people in the current artificial reality application or environment, a places UI element that when selected allows the user to view information about the current artificial reality environment 124 or places/environments previously visited, or a search UI element that when selected allows the user to search for people, places, artificial reality experiences (e.g., games, applications), and the like. In some examples, artificial reality application server 107 performs backend network operations to change artificial reality application settings or preferences, obtain information about users in the artificial reality environment, obtain information about the artificial reality environment or other environments, or perform searches based on instructions formulated by the artificial reality application in response user input at the personal menu items.

In some examples, user 110 may select suspend mode UI element 142 or personal UI element 144 with a selection gesture comprising placement of one or more fingers on or near the corresponding UI element (e.g., on the physical surface on which it rendered or near the physical location corresponding to the UI element). In the example shown in FIG. 1A, UI menu 140 is presented on the inside surface of virtual arm 137 and user 110 may touch the portion of arm 134 corresponding to the virtual location of suspend mode UI element 142 or personal UI element 144, which provides natural haptic feedback to user 110 when selecting either UI element. That is, the physical contact between the one or more fingers of the user's hand and arm 136 may provide the user with a simulation of the sensation felt by the user when interacting directly with a physical user input object, such as a button on a physical keyboard or other physical input device. This can simplify and improve the precision of gesture detection. By defining the UI activation gesture based on a motion of the user's hand, the user may quickly and intuitively activate the UI menu 140 to enable the suspend mode feature. In this way, user 110 may take a break from artificial reality environment 124 without having to take HMD 112 off and while HMD 112 continues to receive data corresponding to artificial reality environment 124 as other users continue to participate in the artificial reality environment 124. By continuing to receive data corresponding to artificial reality environment 124 while other users continue to participate in artificial reality environment 124, HMD 112 will not have a backlog of data updates to process when user 110 returns to artificial reality environment 124 from the suspend mode environment, which enables user 110 to more quickly return to participating in artificial reality environment 124 by reducing data processing delays for a more pleasing user experience.

Figure 1B:
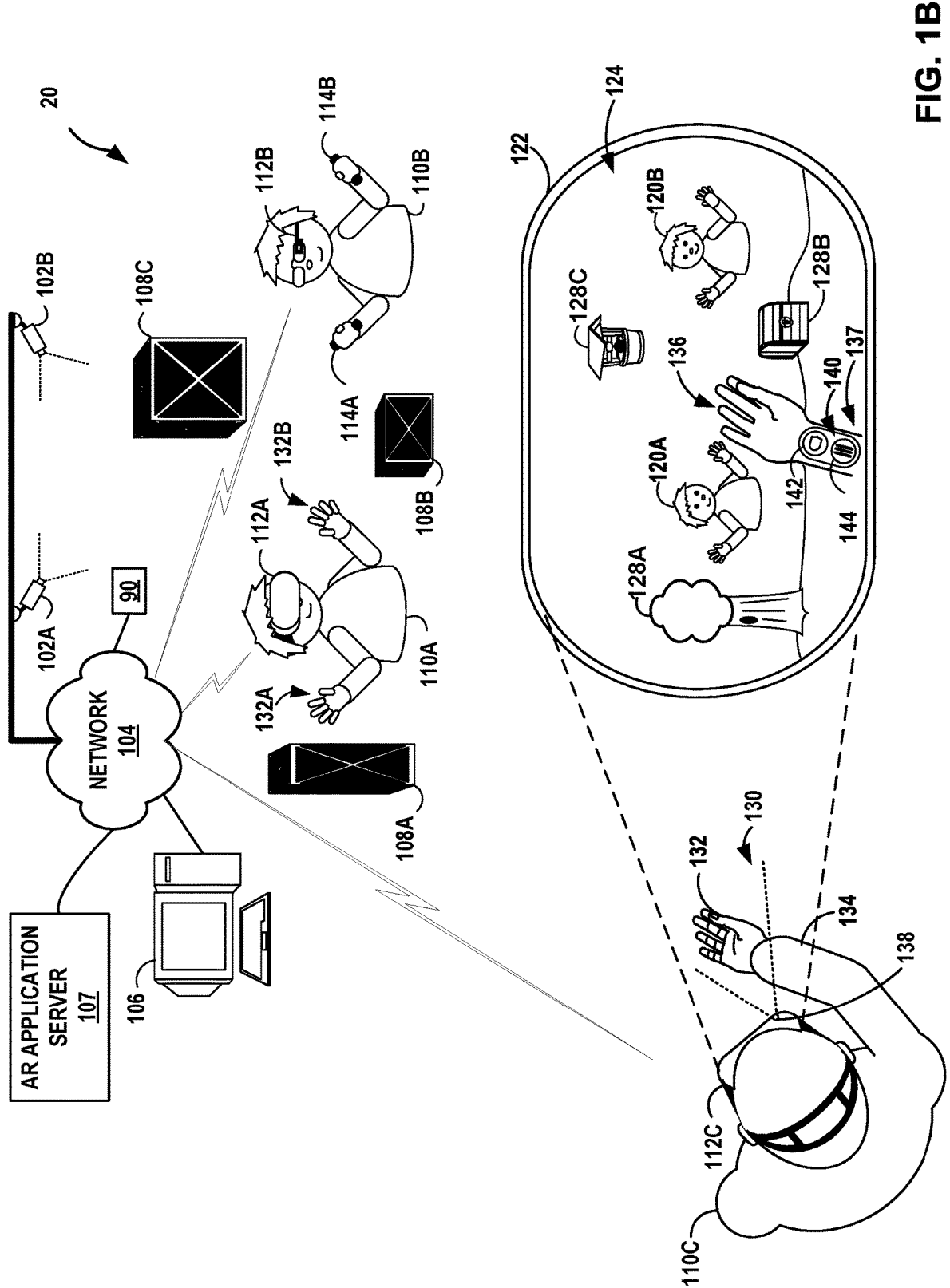
FIG. 1B is an illustration depicting another example artificial reality system having a suspend mode feature, in accordance with the techniques of the disclosure.

FIG. 1B is an illustration depicting another example artificial reality system 20 having a suspend mode feature, concurrently executing artificial reality applications, in accordance with the techniques of the disclosure. In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, artificial reality application server 107, and sensors 90.

As shown in FIG. 1B, artificial reality system 20 represents a multi-user environment in which a plurality of artificial reality applications executing on console 106 and/or HMDs 112 are concurrently running and displayed on a common rendered scene presented to each of users 110A-110C (collectively, "users 110") based on a current viewing perspective of a corresponding frame of reference for the respective user. That is, in this example, each of the plurality of artificial reality applications constructs artificial reality environment 124 by tracking and computing pose information for a frame of reference for each of HMDs 112. Artificial reality system 20 uses data received from cameras 102, HMDs 112, and controllers 114 to capture 3D information within a real world environment, such as motion by users 110 and/or tracking information with respect to users 110 and objects 108, for use in computing updated pose information for a corresponding frame of reference of HMDs 112. In some examples, each users 110 may be in the same or different real-world environment (e.g., in the same or different physical locations). Either way, the plurality of artificial reality applications may render on the same scene within artificial reality environment 124, based on a current viewing perspective determined for HMD 112C, artificial reality content 122 having virtual objects 128A-128C (collectively, "virtual objects 128") as spatially overlaid upon real world objects 108A-108C (collectively, "real world objects 108"). Further, from the perspective of HMD 112C, artificial reality system 20 renders avatars 120A, 120B based upon the estimated positions for users 110A, 110B, respectively, within artificial reality environment 124. Artificial reality content 122 shown in FIG. 1B may be an example of an artificial reality environment prior to enabling the suspend mode feature, in accordance with the techniques of this disclosure.

Each of HMDs 112 concurrently operates within artificial reality system 20. In the example of FIG. 1B, each of users 110 may be a "participant" (or "player") in the plurality of artificial reality applications, and any of users 110 may be a "spectator" or "observer" in the plurality of artificial reality applications. HMD 112C may operate substantially similar to HMD 112 of FIG. 1A by tracking hand 132 and/or arm 134 of user 110C. HMD 112A may also operate substantially similar to HMD 112 of FIG. 1A and receive user inputs by tracking movements of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using another type of communication links.

As shown in FIG. 1B, in addition to or alternatively to image data captured via camera 138 of HMD 112C, input data from external cameras 102 may be used to track and detect particular motions, configurations, positions, and/or orientations of hands and arms of users 110, such as hand 132 of user 110C, including movements of individual and/or combinations of digits (fingers, thumb) of the hand. Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

In a manner similar to the examples discussed above with respect to FIG. 1A, console 106 and/or HMD 112C of artificial reality system 20 may detect one or more UI activation gestures intended to trigger a desired response by the artificial reality application, such as triggering display of a UI element used to select the suspend mode environment and/or triggering execution of the suspend mode environment. For example, user 110 may move the inside wrist area (or any other area) of hand 132 into the current field of view 130 to trigger the display of a UI menu 140 including suspend mode UI element 142 and personal UI element 144 at least partially over or near the virtual wrist of virtual hand 136. User 110C may enter user input selecting suspend mode UI element 142 to enable the suspend mode feature. For example, user 110C may select suspend mode UI element 142 with a touch gesture comprising placement of a one or more fingers of the user's hand at an area corresponding to where the suspend mode UI element 142 is rendered such that the one or more virtual fingers of the avatar touches the suspend mode UI element 142 in artificial reality environment 124.

When activated, the suspend mode feature will freeze avatars 120A, 120B (e.g., render avatars 120A, 120B in static positions), mute all audio coming from artificial reality environment 124 (including from avatars 120A, 120B), and/or replace artificial reality environment 124 surrounding avatars 120A, 120B with a suspend mode environment at HMD 112C. That is, HMD 112C will replace everything except for avatars 120A, 120B within artificial content 122 with a suspend mode environment comprising a solid-color background. For example, HMD 112C will remove (e.g., cease to display) all virtual objects 128 other than avatars 120A, 120B while in the suspend mode environment. In some examples, HMD 112C will remove weapons or handheld objects from avatars 120A, 120B. In some examples, HMD 112C will disable any microphones such that avatars 120A, 120B may not hear user 110. In some examples, user 110 may not be able to interact with the artificial reality environment 124 when the suspend mode feature is enabled. In this way, user 110C may take a break from artificial reality environment 124 without having to take HMD 112C off and while continuing to receive data corresponding to artificial reality environment 124 as users 110A, 110B continue to participate in the artificial reality environment 124. By continuing to receive data corresponding to artificial reality environment 124 while users 110A, 110B continue to participate in the artificial reality environment at HMD 112A, 112B, respective, HMD 112C will not have a backlog of data updates to process when returning to artificial reality environment 124 from the suspend mode environment, which enables the user to more quickly return to participating in artificial reality environment 124 by reducing data processing delays for a more pleasing user experience.

In some examples, the suspend mode feature will move one or more of the frozen avatars away from user 110C in the suspend mode environment displayed at HMD 112C when the one or more avatars are within a personal space threshold from the user (e.g., within one or two meters) when the suspend mode feature is enabled. For example, HMD 112C would move avatar 120A back a particular distance (e.g., two or three meters) if avatar 120 was within the personal space threshold from user 110C when the suspend mode feature was activated at HMD 112C. In some examples, user 110C may be able to rotate field of view 130 (e.g., 360 degrees in all directions) while in the suspend mode environment but the avatar corresponding to user 110C would be unable to move from its current location within the suspend mode environment. In some examples, the avatar corresponding to user 110C may move about within a particular radius (e.g., three meters) within the suspend mode environment. In some examples, only the avatars of the one or more other users that were in a 360-degree line of sight from user 110C at the time the suspend mode feature was enabled would be rendered while in the suspend mode environment. For example, avatars for other users that are far away, at a higher elevation (e.g., on a virtual mountain top or on any other virtual object), or at a lower elevation (e.g., on the bottom of a virtual ditch) but were still visible from a 360-degree line of sight from user 110C while in the artificial reality environment 124 at the time the suspend mode feature was enabled will be displayed in the suspend mode environment at HMD 112C. Conversely, an avatar for another user that was behind a virtual wall or otherwise obstructed by a virtual object when the suspend mode feature was enabled will not be rendered in the suspend mode environment. For example, HMD 112C would not display an avatar of a user hiding behind virtual object 128A within the suspend mode environment at HMD 112C, even after removing virtual object 128A. In some examples, HMD 112C will play ambient sounds (e.g., background sounds or music) while displaying the suspend mode environment to user 110C.

In some examples, users 110A and/or 110B may also enable the suspend mode feature at HMD 112A and/or 112B, respectively. For example, user 110A may enable the suspend mode feature at HMD 112A via user input during a period of time in which the suspend mode feature is also enabled at HMD 112C. During that period of time, HMD 112C may display a first suspend mode environment and HMD 112A may display a second suspend mode environment, different than the first suspend mode environment. For example, user 11C may be unable to interact with avatar 120A in the first suspend mode environment and user 110A may be unable to interact with an avatar corresponding to user 110C in the second suspend mode environment. In some examples, avatar 120A may not be displayed in the first suspend mode environment by HMD 112C if the suspend mode feature was enabled at HMD 112A when the suspend mode feature was enabled at 112C, and vice versa. It should be understood that while the first and second suspend mode environments may be different, both the first and second suspend mode environments may include the same background and/or ambient sounds (e.g., the two environments may look and feel the same).

Figure 2A:
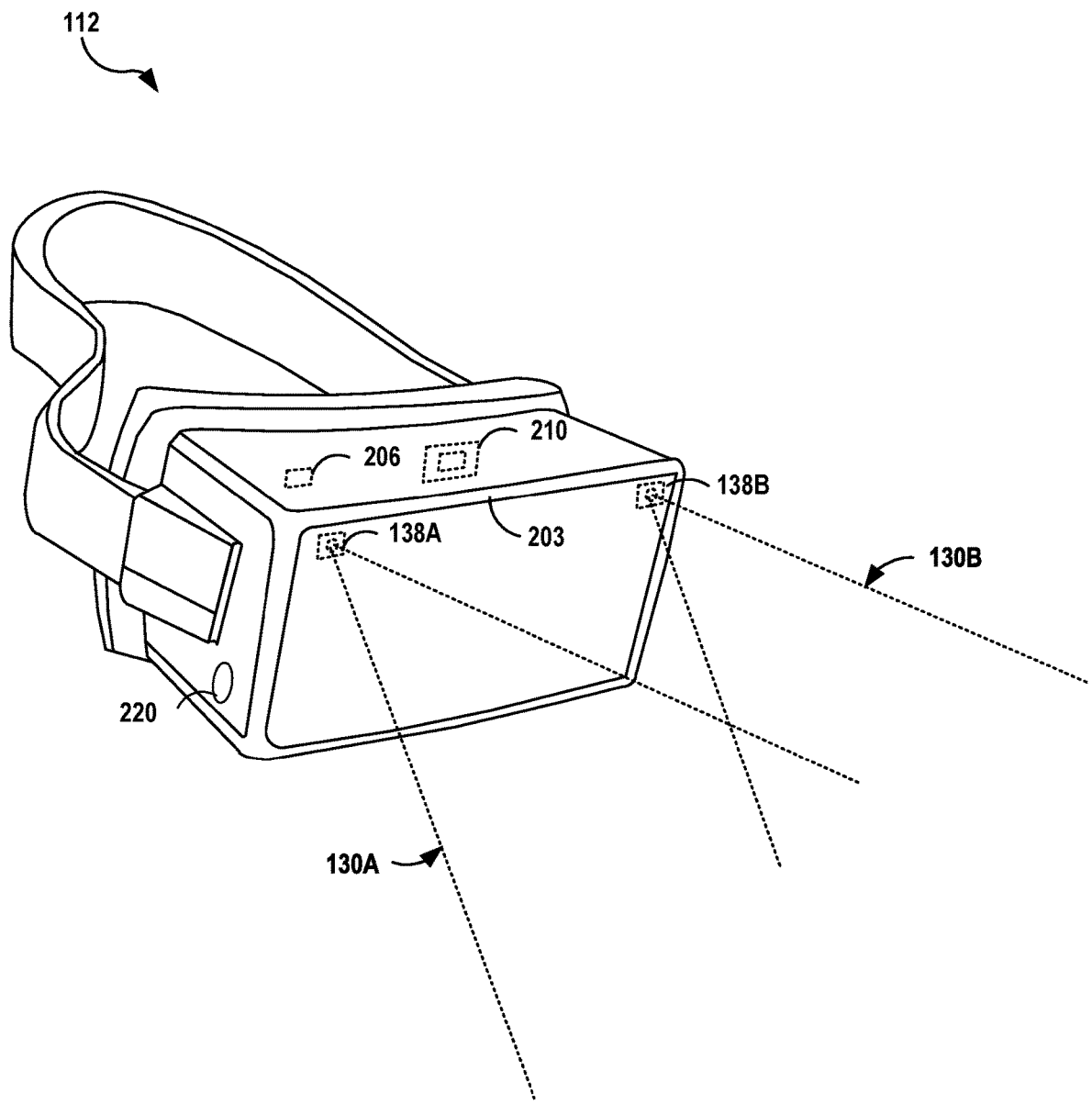
FIG. 2A is an illustration depicting an example HMD that operates in accordance with the techniques of the disclosure.

FIG. 2A is an illustration depicting an example HMD 112 that operates in accordance with the techniques of the disclosure. HMD 112 of FIG. 2A may be an example of any of HMDs 112 of FIGS. 1A and 1B. HMD 112 may be part of an artificial reality system, such as artificial reality systems 10, 20 of FIG. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

Figure 2B:
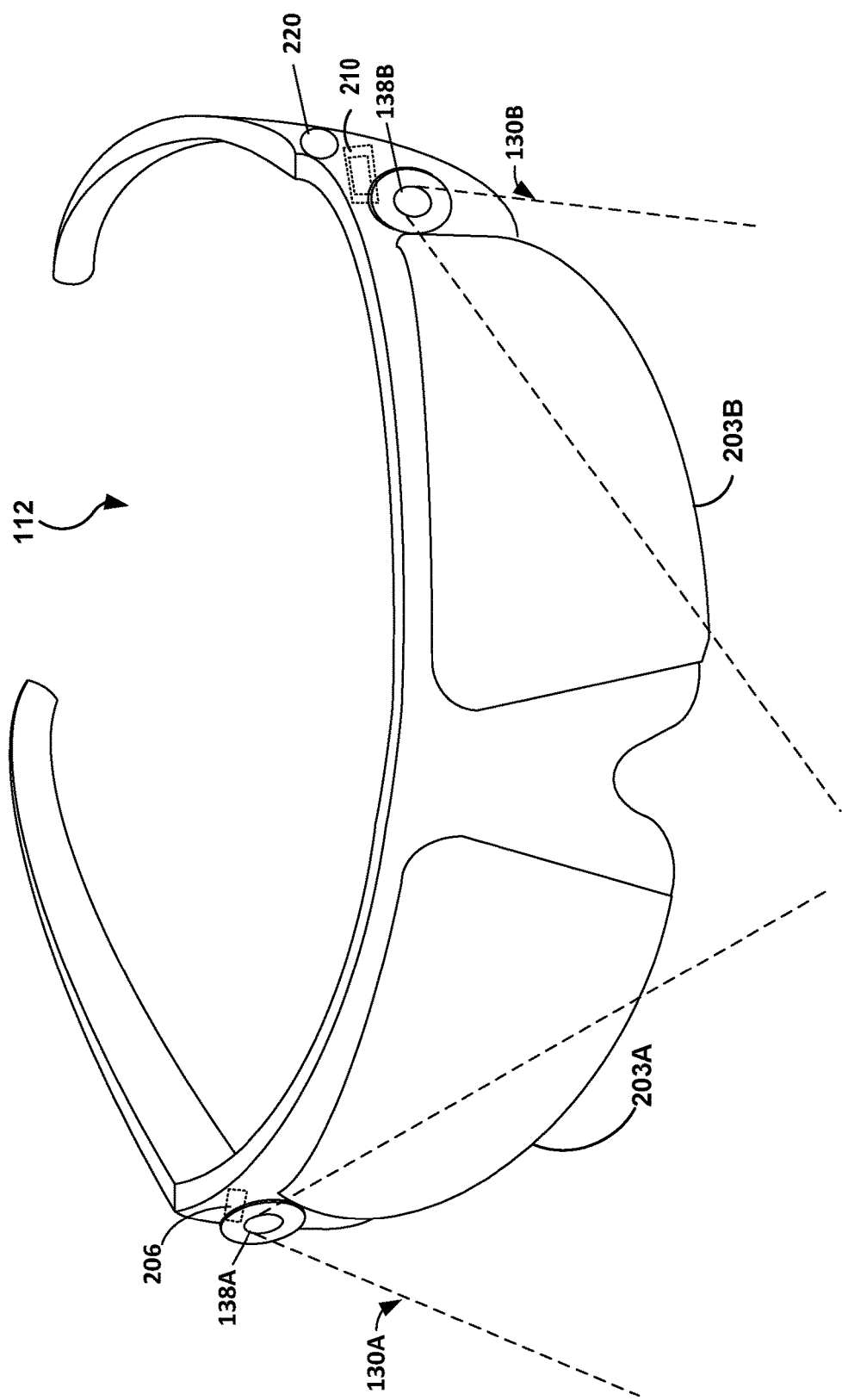
FIG. 2B is an illustration depicting another example HMD, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIG. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Figure 3:
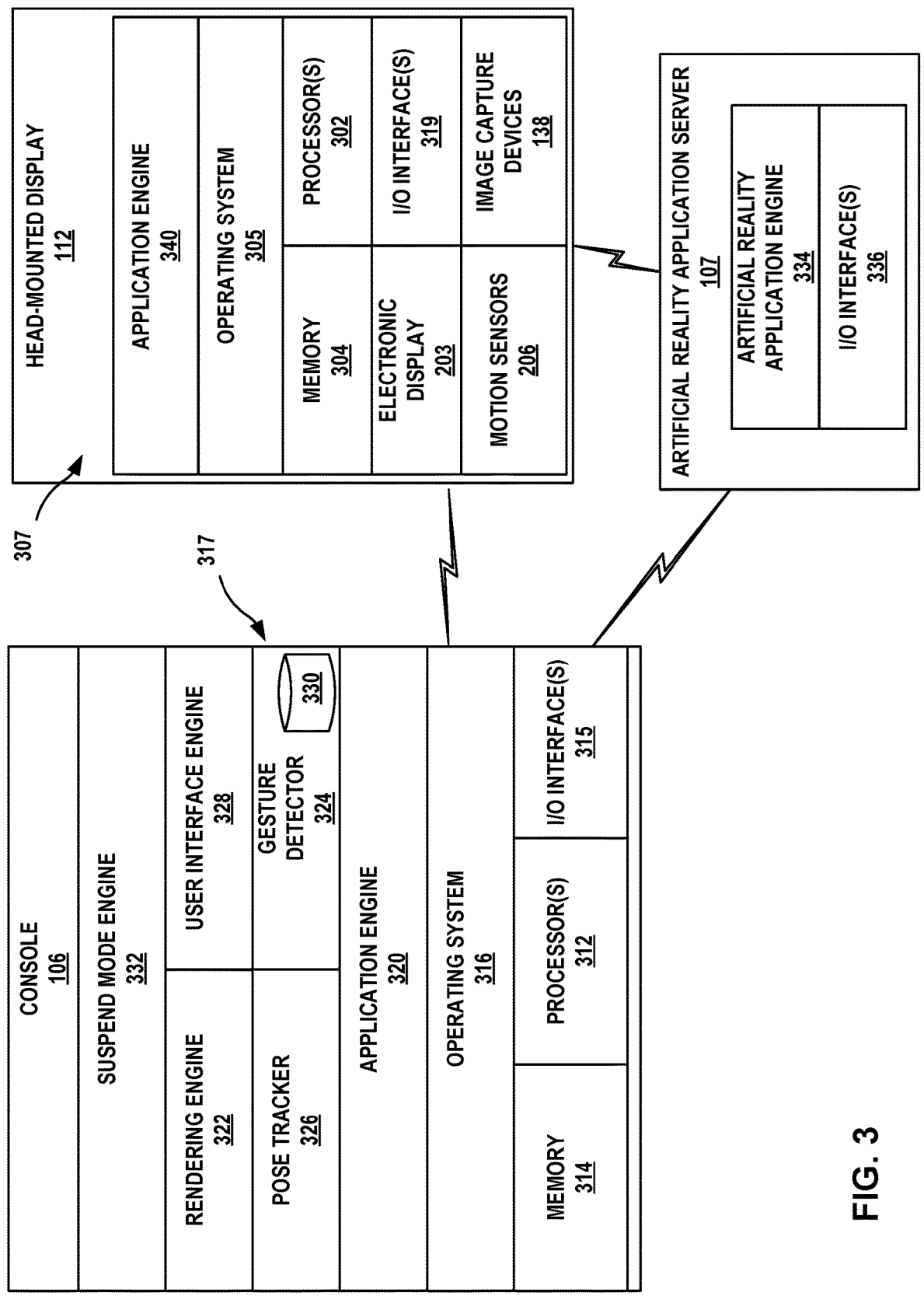
FIG. 3 is a block diagram showing example implementations of a console, an artificial reality application server, and an HMD of the artificial reality system that generates a suspend mode environment during execution of an artificial reality application, in accordance with the techniques of the disclosure.

FIG. 3 is a block diagram showing example implementations of a console 106, artificial reality application server 107, and HMD 112 of the artificial reality system that generates a suspend mode environment during execution of an artificial reality application, in accordance with the techniques of the disclosure. In the example of FIG. 3, console 106 performs pose tracking, gesture detection, and generation and rendering for the artificial reality application running and outputting content for display on electronic display 203 of HMD 112. In some examples, pose tracking, gesture detection, and/or generation and rendering for the artificial reality application may performed at HMD 112, a described below with reference to FIG. 4.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. Processors 302 are further coupled to one or more I/O interfaces 319, which provide I/O interfaces for communicating with other devices such as display devices, image capture devices, other HMDs, and the like. Moreover, the one or more I/O interfaces 319 may include one or more wired or wireless network interface controllers (NICs) for communicating with a network, such as network 104. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform gesture detection and user interface generation for HMD 112. In some examples, console 106 is a single computing device, such as a server, workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices (including HMDs).

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with devices, such as a keyboard, game controllers, display devices, image capture devices, HMDs, input devices, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 include application engine 320, rendering engine 322, gesture detector 324, pose tracker 326, user interface engine 328, and suspend mode engine 332 artificial reality application engine 334. In general, application engine 320 includes functionality to provide and present an artificial reality application, e.g., a social networking application, a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110. In some examples, application engine 340 allows a user of HMD 112 to capture image data of the artificial content displayed at electronic device 203.

Based on the sensed data from any of the image capture devices 138 or 102, or other sensor devices, gesture detector 324 analyzes the tracked motions, configurations, positions, and/or orientations of HMD 112 and/or physical objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify a hand and/or arm of user 110, and track movements of the hand and/or arm relative to HMD 112 to identify gestures performed by user 110. Gesture detector 324 may track movement, including changes to position and orientation, of arm, hand, and/or digits based on the captured image data, and compare motion vectors of the objects to one or more entries in gesture library 330 to detect a gesture or combination of gestures performed by user 110.

Some entries in gesture library 330 may each define a gesture as a series or pattern of motion, such as a relative path or spatial translations and rotations of a user's hand, specific fingers, thumbs, wrists and/or arms. Some entries in gesture library 330 may each define a gesture as a configuration, position, and/or orientation of the user's hand and/or arms (or portions thereof) at a particular time, or over a period of time. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, in accordance with the techniques of this disclosure, certain specialized gestures may be pre-defined such that, in response to detecting one of the pre-defined gestures, application engine 340 may generate UI menu 140 including suspend mode UI element 142 for display to user 110 as an overlay to the virtual content of artificial reality environment 124 of the artificial reality application (e.g., as shown in FIGS. 1A, 1B). These predefined gestures to generate UI menu 140 may include moving the inside wrist area (or any area) of the user's hand into the current field of view of HMD 112 (e.g., similar to a user looking at a wrist watch or other wearable device). Other gestures may include a selection gesture comprising placement of one or more fingers of the user's hand near the physical location corresponding to a UI element such that the one or more fingers of a virtual hand of an avatar of the user of HMD 112 comes in contact with the UI element in the artificial reality environment.

In response to gesture detector 324 detecting a selection gesture on suspend mode UI element 142, suspend mode engine 332 may enable the suspend mode feature at HMD 112 during execution of an artificial reality application. For example, suspend mode engine 332 will replace the artificial reality environment 124 with a suspend mode environment, mute all audio coming from artificial reality environment 124, and/or render any one or more avatar from the artificial reality environment at static poses (e.g., positions and orientations) at HMD 112. In some examples, the suspend mode environment comprising a solid-color background. In some examples, suspend mode engine 332 will move one or more of the frozen avatars away from the user in the suspend mode environment displayed at electronic display 203 of HMD 112 when the one or more avatars are within a personal space threshold from the user (e.g., within one or two meters) when the suspend mode feature is enabled. In some examples, suspend mode engine 332 will play ambient sounds (e.g., background sounds or music) while displaying the suspend mode environment at electronic display 203 of HMD 112. In some examples, suspend mode engine 332 disables the ability of a user of HMD 112 to capture image data of the artificial content displayed at electronic device 203. For example, a user of HMD 112 would be unable to capture image data of the rendered avatars in the suspended mode environment. In some examples, suspend mode engine 332 disables any microphones of HMD 112 or ceases to transmit audio from HMD 112 to other users such that the other users in the artificial reality environment cannot hear the user of HMD 112.

In some examples, suspend mode engine 332 allows the user of HMD 112 to select a rendered avatar corresponding to another user from the suspended mode environment and perform one or more operations corresponding to that avatar/user. For example, the user of HMD 112 may select an avatar and view the corresponding user's profile or to friend, message, block, or report that user. In some examples, suspend mode engine 332 may formulate instructions that are to be performed by the artificial reality application server 107 to obtain a profile, friend, message, mute, block, or report a user based on user input on a user interface presented to user 110 at HMD 112.

In this example, HMD 112 and console 106 are illustrated as being in communication with artificial reality application server 107 (e.g., via network 104), which performs backend network operations for an artificial reality application executing on console 106 and/or HMD 112. As shown in FIG. 3, artificial reality application server 107 may include artificial reality application engine 334 and I/O interface(s) 336. Artificial reality application server may include further hardware and software components, such as one or more processors, memory, operating system, and so on. These other components are not shown for simplicity.

Artificial reality application engine 334 may manage relationships between users (e.g., friendships), maintain profiles for users, coordinate games with one or more users (e.g., place one or more users in a game, maintain score), or perform any other network-end operations to execute the artificial reality application on console 106 and/or HMD 112. For example, artificial reality application engine 334 may include functionality to obtain a particular user's profile or to friend, message, block, or report a user in response to user input received from HMD 112 and/or console 106. In some examples, artificial reality application engine 334 may include one or more software packages, software libraries, hardware drivers, and/or Application Program Interfaces (APIs) for implementing profile, friending, messaging, blocking, and/or reporting operations on a network level.

Artificial reality application engine 334 may access one or more databases (not shown), via I/O interface(s) 336, containing user profiles. These user profiles may each include one or more pictures and/or information about a particular user. For example, if the user of HMD 112 blocks another user, the other user will be unable to see or otherwise interact with the user of HMD 112 in the artificial reality environment (or in any other artificial reality environment or application) (and vice versa), to search for the user of HMD 112 on the network, to message the user of HMD 112, or friend the user of HMD 112 via artificial reality application server 107. In some examples, artificial reality application engine 334 may prevent the two users from later being placed in the same artificial reality environment or artificial reality application (e.g., in the same game). In some examples, the user of HMD 112 may indicate whether to block the other user immediately, after the completion of the current artificial reality application (e.g., the completion of a game), or when the user exits the artificial reality environment. In some examples, the user of HMD 112 may indicate to mute the other user within the artificial reality environment and block that other user when the user of HMD 112 exits the artificial reality environment (e.g., mute the other user during the current game and block them once the game terminates). In some examples, blocked users will be unable to see, hear, or otherwise interact with the user and/or his avatar in the artificial reality environment. If the user of HMD 112 mutes another user, the user of HMD 112 will be unable to hear audio coming from that other user when the user of HMD 112 returns to the artificial reality environment. For example, suspend mode engine 332 will mute the audio coming from that other user at HMD 112. If the user of HMD 112 reports another user, artificial reality application engine 334 will flag the user for review by a review entity associated with the artificial reality environment or application. In some examples, artificial reality application engine 334 may record interactions between the user of HMD 112 and the other user within the artificial reality environment for review.

In some examples, console 106 and/or HMD 112 continues to receive, via I/O interfaces 315 and/or 319, data corresponding to the artificial reality environment (e.g., game data, position data) while the suspend mode feature is enabled at HMD 112 (e.g., from other HMDs, consoles, and/or artificial reality application server 107. For example, console 106 and/or HMD 112 may continue to receive position information for one or more avatars that are continuing to participate in the artificial reality environment even though the positions of the one or more avatars in the suspended mode environment are not updated. In this way, the user of HMD 112 may take a break from artificial reality environment while other users continue to participate in the artificial reality environment. By continuing to receive data corresponding to artificial reality environment, HMD 112 and/or console 106 will not have a backlog of data updates to process when the user of HMD 112 returns to the artificial reality environment from the suspend mode environment, which enables the user of HMD 112 to more quickly restart participating in artificial reality environment 124 by reducing data processing delays for a more pleasing user experience.

Figure 4:
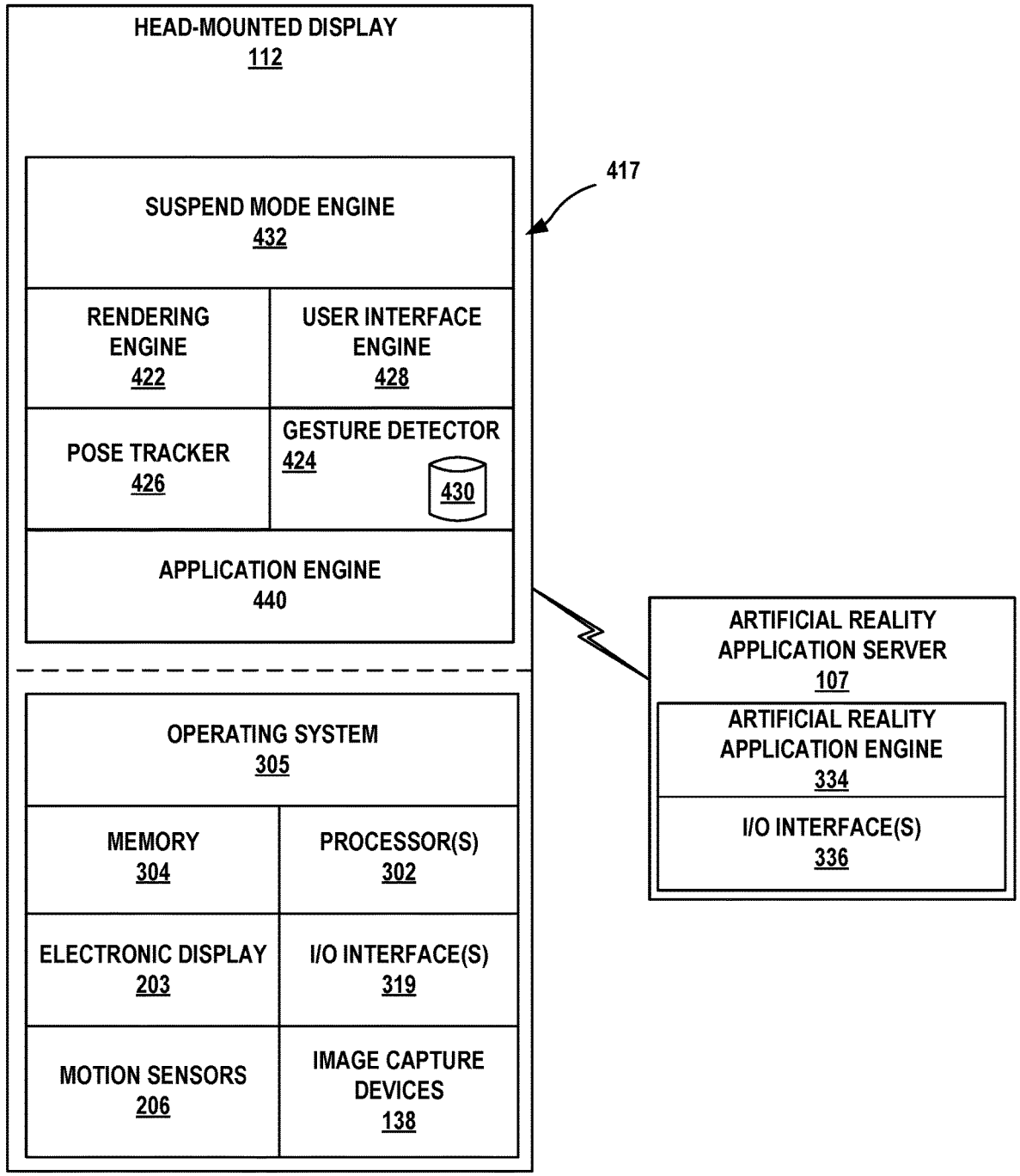
FIG. 4 is a block diagram depicting an example HMD and an artificial reality application server of the artificial reality system that generates a suspend mode environment during execution of an artificial reality application, in accordance with the techniques of the disclosure.

FIG. 4 is a block diagram depicting an example HMD 112 and an artificial reality application server of the artificial reality system that generates a suspend mode environment during execution of an artificial reality application, in accordance with the techniques of the disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, I/O interfaces 319, and image capture devices 138.

In the example of FIG. 4, software components 417 include application engine 440, rendering engine 422, gesture detector 424, pose tracker 426, interface engine 428, and suspend mode engine 432. In various examples, software components 417 operate similar to the counterpart components of console 106 of FIG. 3 (e.g., application engine 340, rendering engine 322, gesture detector 324, pose tracker 326, user interface engine 328, and suspend mode engine 332). In some examples, rendering engine 422 constructs the 3D, artificial reality content which may be overlaid, at least in part, upon the real-world, physical environment of user 110.

Similar to the examples described with respect to FIG. 3, application engine 440 and rendering engine 422 construct the artificial content for display to user 110 in accordance with current pose information for a frame of reference, typically a viewing perspective of HMD 112, as determined by pose tracker 426. Based on the sensed data, pose tracker 426 determines a current pose for the frame of reference of HMD 112 and, in accordance with the current pose, constructs the artificial reality content for display to user 110.

In addition, based on the sensed data, gesture detector 424 analyzes the tracked motions, configurations, positions, and/or orientations of objects (e.g., hands, arms, wrists, fingers, palms, thumbs) of the user to identify one or more gestures performed by user 110. Gesture detector 424 may track movement, including changes to position and orientation, of hand, digits, and/or arm based on the captured image data, and compare motion vectors of the objects to one or more entries in gesture library 430 to detect a gesture or combination of gestures performed by user 110. Gesture library 430 is similar to gesture library 330 of FIG. 3.

Based on gesture detector 424 detecting a UI activation gesture, application engine 440 may generate UI menu 140 including suspend mode UI element 142 for display to user 110 as an overlay to the virtual content of artificial reality environment 124 of the artificial reality application (e.g., as described above with reference to FIGS. 1A, 1B, 3). Gesture detector may then detect a selection gesture on the suspend mode UI element 142 and suspend mode engine 432 may, in response, replace the artificial reality environment of the artificial reality application with a suspend mode environment, mute all audio coming from the artificial reality environment, and/or render any one or more avatar from the artificial reality environment in static positions, as described above with reference to FIG. 3. Suspend mode engine 432 may further allow the user of HMD 112 to select a frozen avatar corresponding to another user from the suspended mode environment and perform one or more operations, including viewing the corresponding user's profile at HMD 112 or to friend, message, block, or report that user, as described above with reference to FIG. 3. In some examples, artificial reality application server 107 implements the artificial reality application backend network functionality to obtain a user's profile or to friend, message, block, or report a user, as described above with reference to FIG. 3. In some examples, suspend mode engine 432 implements the functionality to mute another user at HMD 112, as described above with reference to FIG. 3.

Figure 5:
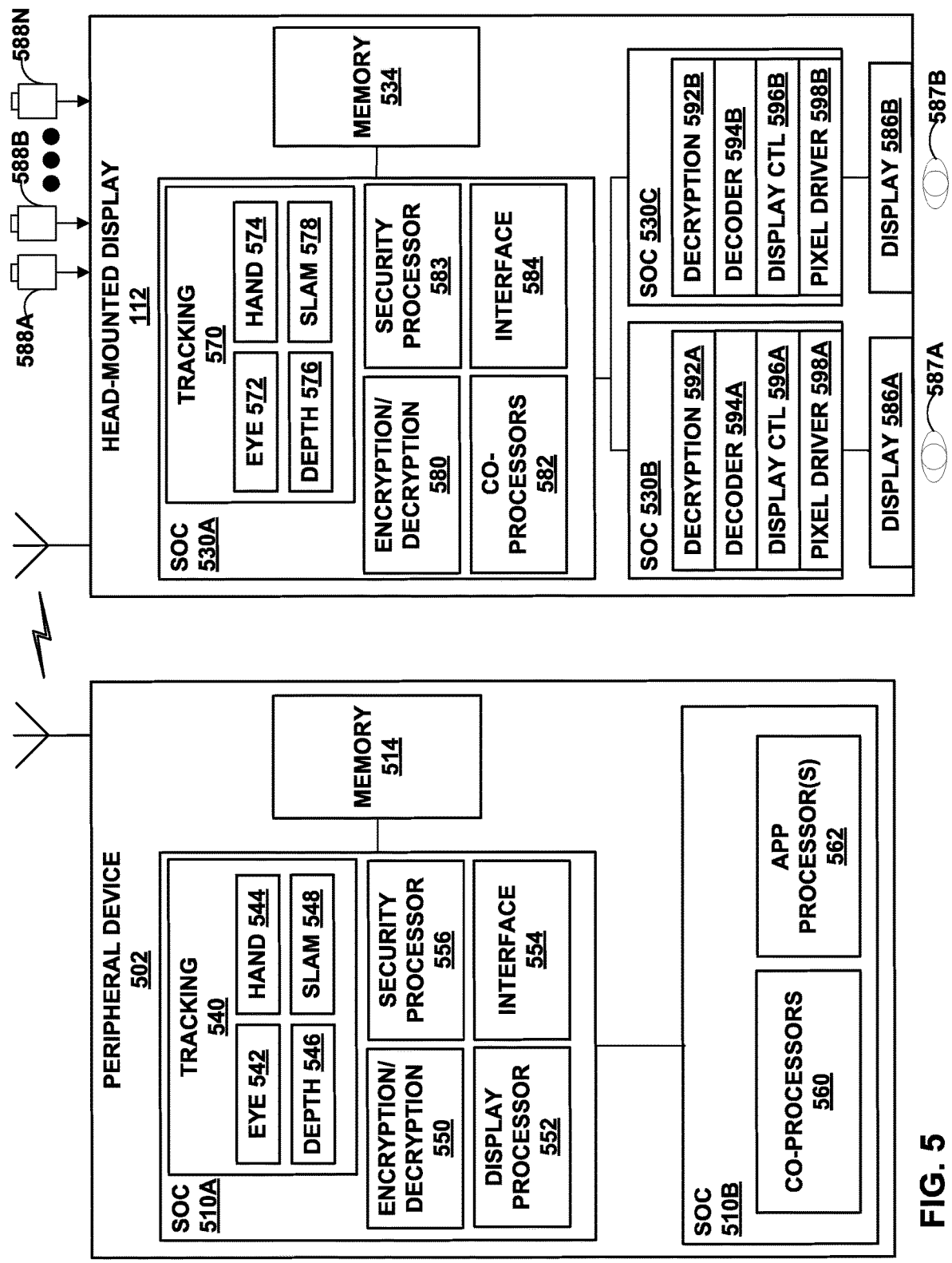
FIG. 5 is a block diagram illustrating a more detailed example implementation of a distributed architecture for a multi-device artificial reality system in which one or more devices are implemented using one or more SoC integrated circuits within each device.

FIG. 5 is a block diagram illustrating a more detailed example implementation of a distributed architecture for a multi-device artificial reality system in which one or more devices are implemented using one or more SoC integrated circuits within each device. In some examples, artificial reality system includes a peripheral device 502 operating in conjunction with HMD 112. In this example, peripheral device 502 is a physical, real-world device having a surface on which the artificial reality system overlays virtual content. Peripheral device 502 may include one or more presence-sensitive surfaces for detecting user inputs by detecting a presence of one or more objects (e.g., fingers, stylus) touching or hovering over locations of the presence-sensitive surface. In some examples, peripheral device 502 may include an output display, which may be a presence-sensitive display. In some examples, peripheral device 502 may be a smartphone, tablet computer, personal data assistant (PDA), or other hand-held device. In some examples, peripheral device 502 may be a smartwatch, smartring, or other wearable device. Peripheral device 502 may also be part of a kiosk or other stationary or mobile system. Peripheral device 502 may or may not include a display device for outputting content to a screen.

In general, the SoCs illustrated in FIG. 5 represent a collection of specialized integrated circuits arranged in a distributed architecture, where each SoC integrated circuit includes various specialized functional blocks configured to provide an operating environment for artificial reality applications. FIG. 5 is merely one example arrangement of SoC integrated circuits. The distributed architecture for a multi-device artificial reality system may include any collection and/or arrangement of SoC integrated circuits.

In this example, SoC 530A of HMD 112 comprises functional blocks including tracking 570, an encryption/decryption 580, co-processors 582, security processor 583, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). For example, HMD 112 may receive input from one or more accelerometers (also referred to as inertial measurement units or "IMUS") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 502 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 is a functional block to encrypt outgoing data communicated to peripheral device 502 or security server and decrypt incoming data communicated from peripheral device 502 or security server. Encryption/decryption 580 may support symmetric key cryptography to encrypt/decrypt data with a session key (e.g., secret symmetric key).

Co-application processors 582 includes various processors such as a video processing unit, graphics processing unit, digital signal processors, encoders and/or decoders, and/or others. In accordance with the techniques described in this disclosure, all or portions of a backend shell may be in hardware, software, or a combination of hardware and software. For example, the backend shell of a concurrent application engine may be executed on co-application processors 582. A plurality of artificial reality applications may be concurrently executed on co-application processors 582.

Security processor 583 provides secure device attestation and mutual authentication of HMD 112 when pairing with devices, e.g., peripheral device 606, used in conjunction within the AR environment. Security processor 583 may authenticate SoCs 530A-530C of HMD 112.

Interface 584 is a functional block that includes one or more interfaces for connecting to functional blocks of SoC 530A. As one example, interface 584 may include peripheral component interconnect express (PCIe) slots. SoC 530A may connect with SoC 530B, 530C using interface 584. SoC 530A may connect with a communication device (e.g., radio transmitter) using interface 584 for communicating with other devices, e.g., peripheral device 136.

SoCs 530B and 530C each represents display controllers for outputting artificial reality content on respective displays, e.g., displays 586A, 586B (collectively, "displays 586"). In this example, SoC 530B may include a display controller for display 558A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 558B to output artificial reality content for a right eye 587B of the user. For example, SoC 530C includes decryption 592B, decoder 594B, display controller 596B, and/or a pixel driver 598B for generating and outputting artificial reality content on display 586B. Displays 558 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 502 includes SoCs 510A and 510B configured to support an artificial reality application. In this example, SoC 510A comprises functional blocks including tracking 540, an encryption/decryption 550, a display processor 552, an interface 554, and security processor 556. Tracking 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). For example, peripheral device 502 may receive input from one or more accelerometers (also referred to as inertial measurement units or "IMUs") that output data indicative of current acceleration of peripheral device 502, GPS sensors that output data indicative of a location of peripheral device 502, radar or sonar that output data indicative of distances of peripheral device 502 from various objects, or other sensors that provide indications of a location or orientation of peripheral device 502 or other objects within a physical environment. Peripheral device 502 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 502 and, in accordance with the current pose, renders the artificial reality content to HMD 112.

Encryption/decryption 550 encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key).

Display processor 552 includes one or more processors such as a video processing unit, graphics processing unit, encoders and/or decoders, and/or others, for rendering artificial reality content to HMD 112.

Interface 554 includes one or more interfaces for connecting to functional blocks of SoC 510A. As one example, interface 584 may include peripheral component interconnect express (PCIe) slots. SoC 510A may connect with SoC 510B using interface 584. SoC 510A may connect with one or more communication devices (e.g., radio transmitter) using interface 584 for communicating with other devices, e.g., HMD 112.

As discussed with respect to the example of FIG. 5, security processor 556 provides secure device attestation and mutual authentication of peripheral device 502 when pairing with devices, e.g., HMD 112, used in conjunction within the AR environment. Security processor 556 may authenticate SoCs 510A, 510B of peripheral device 502.

SoC 510B includes co-application processors 560 and application processors 562. In this example, co-application processors 560 includes various processors, such as a vision processing unit (VPU), a graphics processing unit (GPU), and/or central processing unit (CPU). Application processors 562 may include a processing unit for executing one or more artificial reality applications to generate and render, for example, a virtual user interface to a surface of peripheral device 502 and/or to detect gestures performed by a user with respect to peripheral device 502.

Figure 6:
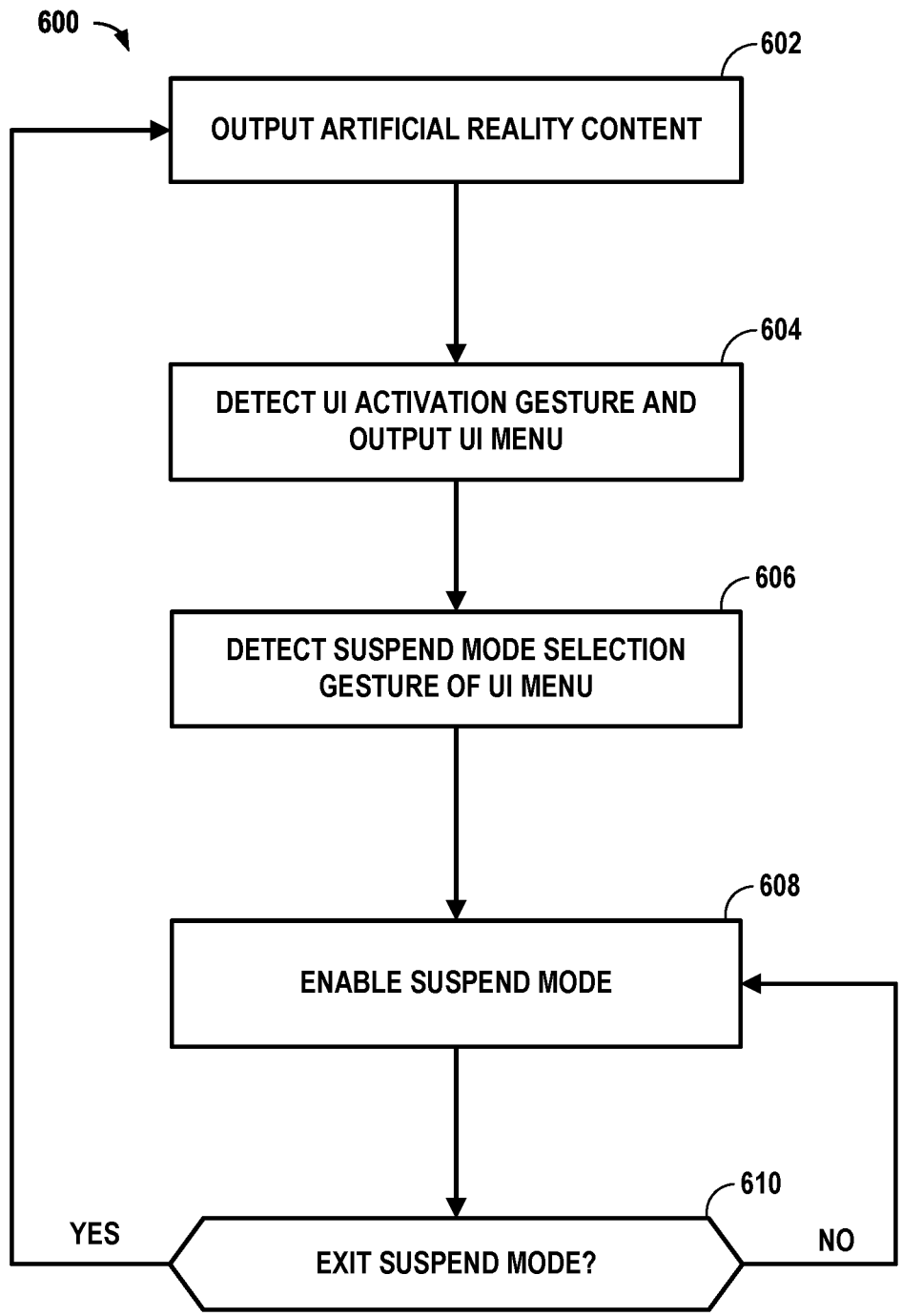
FIG. 6 is a flowchart illustrating example operations to enable a suspend mode environment for an artificial reality system, in accordance with aspects of the disclosure.

FIG. 6 is a flowchart 600 illustrating example operations for enabling a suspend mode environment for an artificial reality system (e.g., artificial reality system 10, 20 of FIGS. 1A, 1B), in accordance with aspects of the disclosure. For purposes of example and explanation, the method of FIG. 6 is explained with respect to HMD 112. However, it should be understood that console 106 may perform one or more of the operations of this method.

Figure 7:
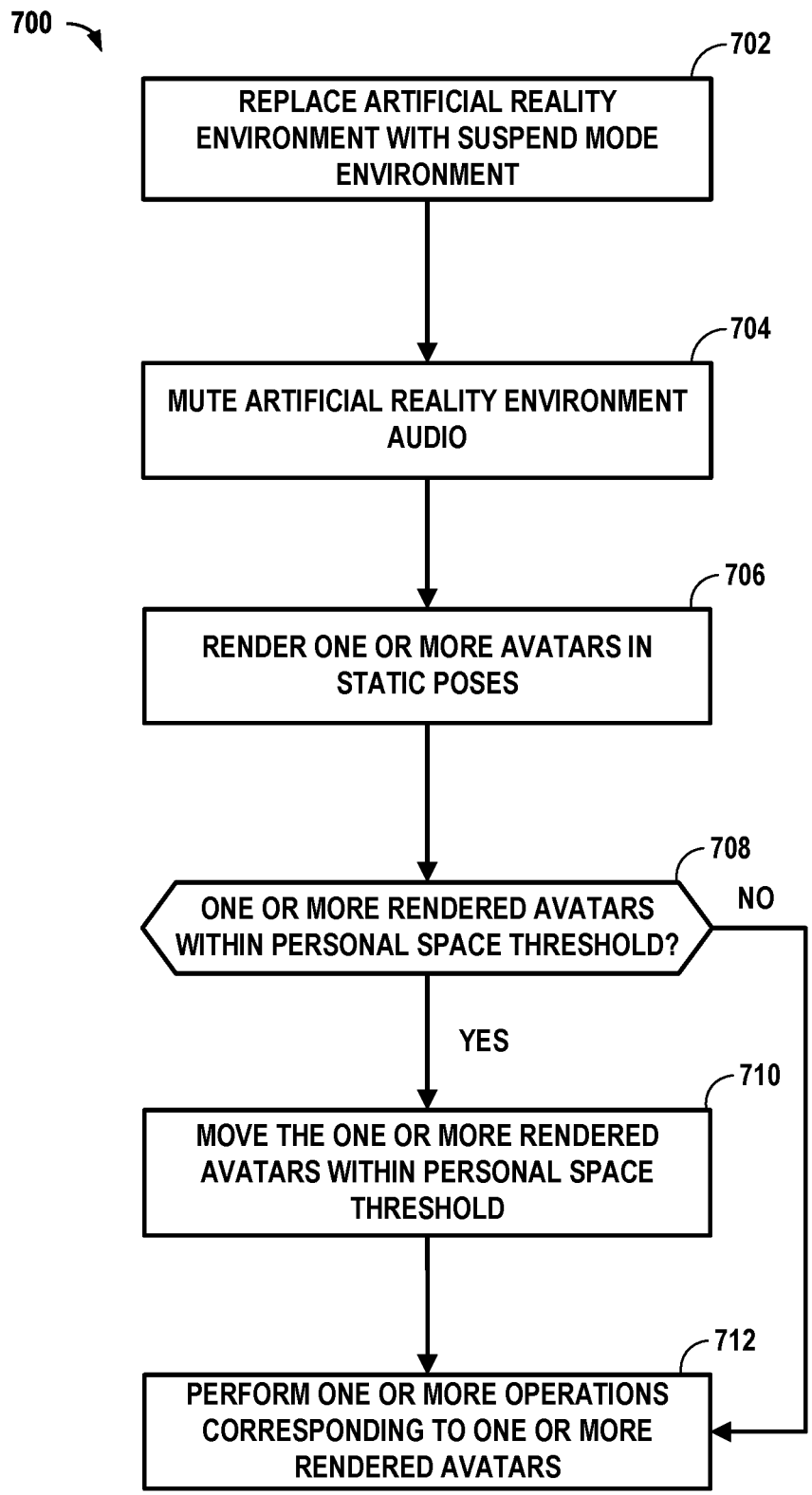
FIG. 7 is a flowchart illustrating example operations while within a suspend mode environment for an artificial reality system, in accordance with aspects of the disclosure.

First, HMD 112 outputs artificial reality content to a user (602). For example, HMD 112 may output an artificial reality environment of artificial reality application, such as a social networking application, a teleconference application, a gaming application, a navigation application, an educational application, training or simulation applications, and the like. The artificial reality content may include one or more avatars corresponding to one or more other users of other HMDs participating in the artificial reality environment. Next, HMD 112 may detect a UI activation gesture comprising the user moving the inside wrist area (or any area) of his or her hand into the field of view of HMD 112 and HMD 112 will output the UI menu partially over or near any surface(s) of the virtual hand corresponding to the user's hand (e.g., as shown in FIGS. 1A, 1B, 7) (604). The UI menu may include a suspend mode UI element and/or a personal UI element, as described above with reference to FIGS. 1A, 1B.

Next, HMD 112 may detect a suspend mode selection gesture of the suspend mode UI element within the UI menu (606). For example, the suspend mode selection gesture may comprise placement of one or more fingers (physical or virtual) of the user on or near the corresponding UI element (e.g., on the physical surface on which the suspend mode UI element is rendered or near the physical location corresponding to where the suspend mode UI element is rendered). In response to detecting the suspend mode selection gesture, HMD 112 enabled the suspend mode, including freezing the one or more other avatars (e.g., rendering the one or more avatars in static positions) and outputting a suspend mode environment at HMD 112 (608). In some examples, the one or more users may continue to participate in the artificial reality environment while the suspend mode is enabled at HMD 112. In some examples, HMD 112 may continue to receive data corresponding to the artificial reality environment, including game status (e.g., scores, remaining lives) information and/or location information for the one or more avatars in the artificial environment, but the user of HMD 112 may not participate in the artificial reality environment from the suspend mode environment. HMD 112 may process this data in the background (e.g., without displaying updates within the suspend mode environment).

HMD 112 will then determine whether the user wishes to exit the suspend mode (610). For example, HMD 112 may determine whether the user selected a UI element within the suspend mode environment. In response to determining that the user does not wish to exit the suspend mode (NO branch of 610), HMD 112 will remain in the suspend mode (e.g., return to 608). In response to determining that the user wishes to exit the suspend mode (YES branch of 610), HMD 112 will output the artificial reality content, including the artificial reality environment to the user of HMD 112 (e.g., return to 602). Because HMD 112 continued to receive and process data corresponding to the artificial reality environment, HMD 112 may more quickly return the user to the artificial reality environment from the suspend mode environment because HMD 112 will not have a backlog of data to process. In this way, the transition between the suspend mode environment and the artificial reality environment may be sharp (e.g., instant or otherwise quick). In some examples, HMD 112 may render a fading effect when transitioning between the suspend mode environment and the artificial reality environment.

FIG. 7 is a flowchart 700 illustrating example operations within a suspend mode environment for an artificial reality system (e.g., artificial reality system 10, 20 of FIGS. 1A, 1B), in accordance with aspects of the disclosure. For purposes of example and explanation, the method of FIG. 7 is explained with respect to HMD 112. However, it should be understood that console 106 may perform one or more of the operations of this method. For example, flowchart 700 is one example of the functions performed by suspend mode engine 332 or 432 (e.g., step 608 of flowchart 600 of FIG. 6) to enable a suspend mode feature at HMD 112.

HMD 112 replaces the artificial reality environment of an artificial reality application with a suspend mode environment (702). For example, HMD 112 may replace the artificial reality content rendered at HMD 112 with a solid color background. This may include ceasing to display structures, the ground/floor, objects (including handheld objects such as weapons) and the like that were in the artificial reality environment. For example, if an avatar was standing on a table when the suspend mode was enabled, the table will not be displayed in the suspend mode environment and that avatar may appear to be floating in the suspend mode environment. In some examples, the background of the suspend mode environment may be changed by the user of HMD 112 (e.g., to other color(s), images, or to include one or more patters).

HMD 112 will also mute the audio from the artificial reality environment at HMD 112 (704). For example, HMD 112 will mute music, voices or other noises from one or more avatars, background noises, and the like. In some examples, HMD 112 may play ambient sounds (e.g., background sounds, music, or white noise) corresponding to the suspend mode environment. For example, HMD 112 may play sounds from nature (e.g., waves crashing on the beach), relaxing music, or other sounds. In some examples, the ambient sounds played in the suspend mode environment may be changed by the user of HMD 112 (e.g., to other music or sounds). In some examples, HMD 112 disables any microphones of HMD 112 or ceases to transmit audio to other users or devices (e.g., other HMDs, console 106) such that the other users in the artificial reality environment cannot hear the user of HMD 112.

HMD 112 will render one or more avatars corresponding to other users in static poses (e.g., position and orientation) within the suspend mode environment (706). The static poses may correspond to the poses the one or more avatars were in within the artificial reality environment when the suspend mode was enabled at the HMD 112. In some examples, HMD 112 may determine whether one or more of the rendered avatars are within a personal space threshold from the user of HMD 112 (e.g., within one or two meters) (708). In response to a determination that one or more rendered avatars are within a personal space threshold (YES branch of 708), HMD 112 moves the one or more rendered avatars back a particular distance (e.g., two or three meters). For example, HMD 112 may render an animation sliding the one or more rendered avatars within the personal space threshold back. In some examples, HMD 112 may simply render the one or more rendered avatars at a static position at or beyond the personal space threshold. Either way, flowchart 700 continues to 712.

In response to a determination that one or more rendered avatars are not within the personal space threshold (NO branch of 708), HMD 112 performs one or more operations corresponding to one or more rendered avatars in the suspend mode environment based on user input (712). For example, the user may select an avatar of another user to friend, message, mute, block, or report that user from the suspend mode environment (e.g., as described above with reference to FIG. 1A, 3). In some examples, artificial reality application server 107 performs backend network operations to friend, message, block, or report a user from the suspend mode environment (e.g., as described above with reference to FIG. 1A, 3). For example, if the user of HMD 112 blocks another user at the network level, the other user will be unable to see or otherwise interact with the user of HMD 112 in the artificial reality environment (or in any other artificial reality environment or application) (and vice versa), to search for the user of HMD 112 on the network, to message the user of HMD 112, or friend the user of HMD 112. If the user of HMD 112 and the other user were already friends, blocking the other user may unfriend the two users. In some examples, console 106 may prevent the two users from later being placed in the same artificial reality environment or artificial reality application (e.g., in the same game). In some examples, the user of HMD 112 may indicate whether to block the other user immediately (such that the blocking would be effective upon the user returning to the artificial reality environment from the suspend mode environment), after the completion of the current artificial reality application (e.g., the completion of a game), or when the user exits the artificial reality environment. In some examples, blocked users will be unable to see, hear, or otherwise interact with the user and/or his avatar in the artificial reality environment. If the user of HMD 112 mutes another user, the user of HMD 112 will be unable to hear audio coming from that other user when the user of HMD 112 returns to the artificial reality environment. In some examples, HMD 112 will continue to receive audio data from that other user but will mute that audio.

Figure 8:
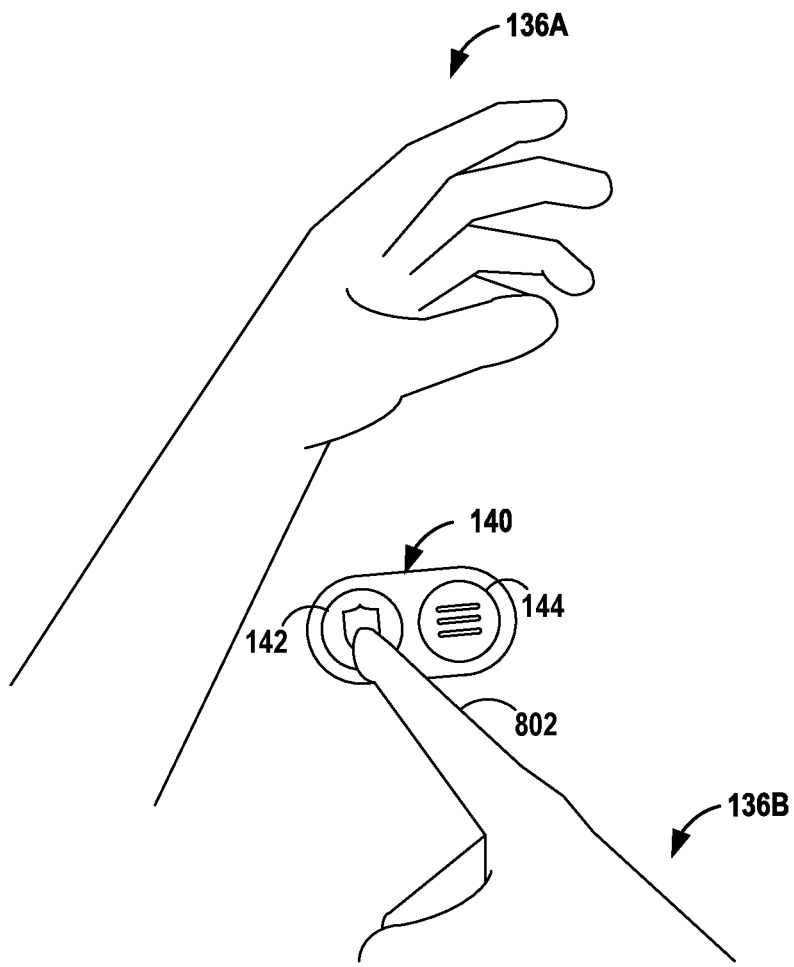
FIG. 8 is an illustration depicting user interaction with an example gesture-driven UI for entering a suspend mode environment during execution of an artificial reality application, in accordance with the techniques of this disclosure.

FIG. 8 is an illustration depicting user interaction with the example gesture-driven UI for entering a suspend mode environment during execution of the artificial reality application, in accordance with the techniques of this disclosure. In particular, FIG. 8 shows virtual hands 136A, 136B (collectively, "virtual hands 136") and UI menu 140, including suspend mode UI element 142 and personal UI element 144, near the virtual hand 136A. In some examples, HMD 112 may have been rendered in response to HMD 112 detecting the inside wrist area of the user's hand corresponding to virtual hand 136 coming into the field of view of HMD 112 (e.g., after detecting UI activation gesture as explained above with reference to FIG. 1A). FIG. 8 further shows the user performing a suspend mode selection gesture comprising placement of virtual finger 802 on suspend mode UI element 142, which corresponds to the user placing a finger in the physical area corresponding to where suspend mode UI element is rendered. In response to HMD 112 detecting the selection gesture on suspend mode UI element 142 (e.g. via captured image data of the user's hand), HMD 112 enables the suspend mode feature. By defining the UI activation and selection gestures based on a motion of the user's hand, the user may quickly and intuitively enable the suspend mode feature.

Figure 9:
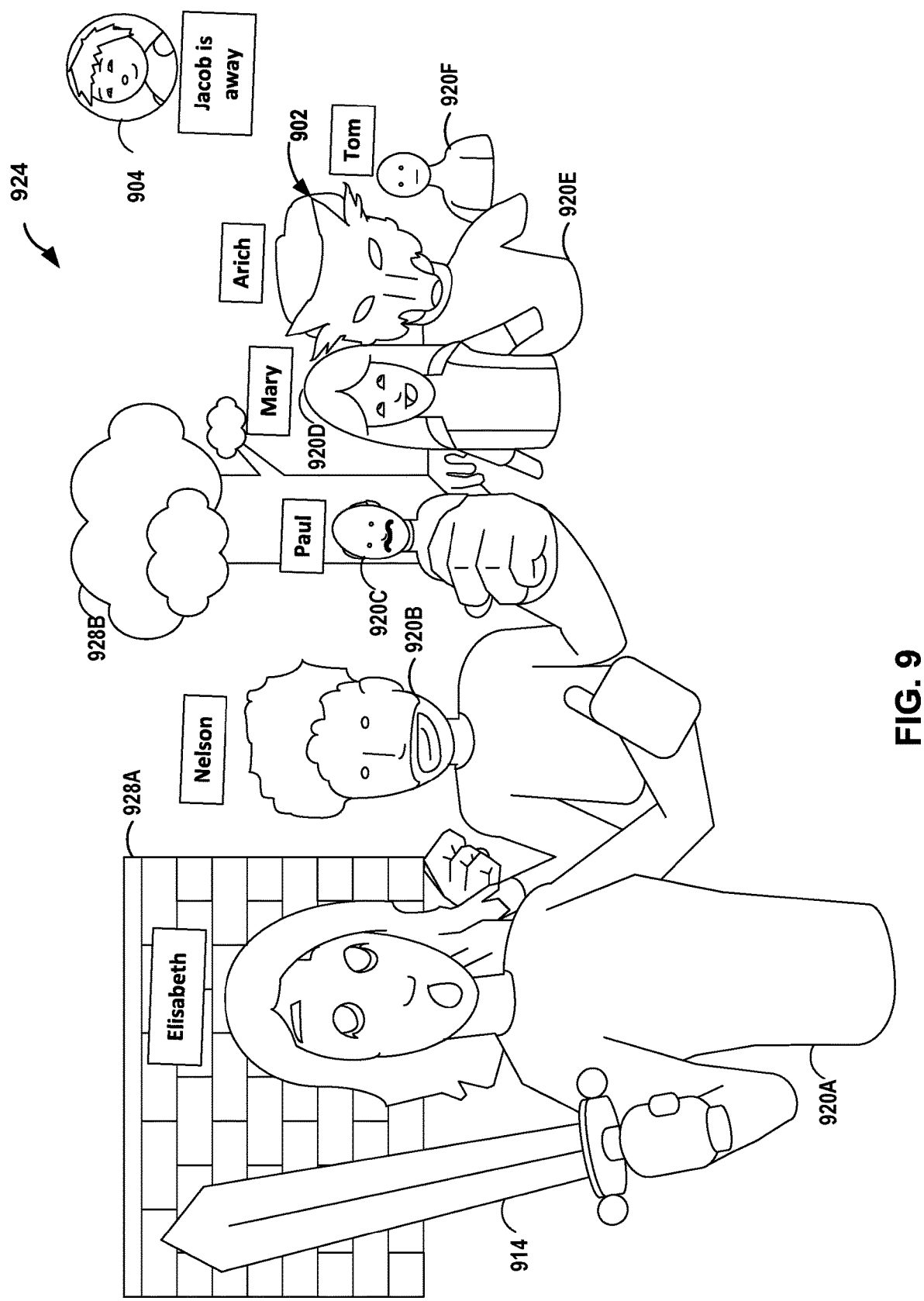
FIG. 9 is an illustration depicting an example artificial reality environment of an artificial reality application, in accordance with the techniques of this disclosure.

FIG. 9 is an illustration depicting an example artificial reality environment 924 of an artificial reality application presented to a user at HMD 112, in accordance with the techniques of this disclosure. In the example illustrated in FIG. 9, artificial reality environment 924 includes avatars 920A, 920B, 920C, 920D, 920E, and 920F (collectively, "avatars 920"), virtual objects 928A and 928B (collectively, "virtual objects 928"), and virtual handheld object 914. In particular, avatars 920 may correspond to other users of HMDs and artificial reality environment 924 may correspond to a gaming application. In some examples, one or more avatars 920 may wear a costume, mask, or accessories. For example, avatar 920E is wearing mask 902 in FIG. 9. In some examples, the outfits or costumes worn by each avatar may be personalized by the respective user. In some examples, avatars 920 may include a graphic element with information about the corresponding user. For example, FIG. 9 shows a graphic element with the first name of the corresponding users to avatars 920. In other examples, these graphics may additionally or alternatively include a game score, remaining life, or any other information about the corresponding user. In some examples, this graphic element may not be included in artificial reality environment 924. Artificial reality environment 924 shown in FIG. 9 may be an example of an artificial reality environment prior to enabling the suspend mode feature, in accordance with the techniques of this disclosure.

While FIG. 9 shows six avatars corresponding to six different users, other avatars may be present in artificial reality environment 924 but may not be visible to the user of HMD 112 because they are not in the field of view of HMD 112, are behind virtual objects (e.g., behind virtual wall 928A), or are too far away (e.g., are positioned beyond a visible threshold). For example, user of HMD 112 may see additional avatars by moving his field of view (e.g., turning around or looking behind virtual wall 928A). FIG. 9 also illustrates virtual graphic 904 corresponding to a user (i.e., Jacob) that is not available. Virtual graphic 904 may include a profile picture of the user and a message indicating that the user is away or otherwise not available. In some examples, the user corresponding to virtual graphic 904 may not be available because he paused his HMD, took his HMD off, enabled a suspend mode feature at his HMD, and the like. Either way, virtual graphic 904 may or may not include an indication of why the user is not available. In some examples virtual graphic 904 may be a "coin" or token corresponding to a user.

Figure 10:
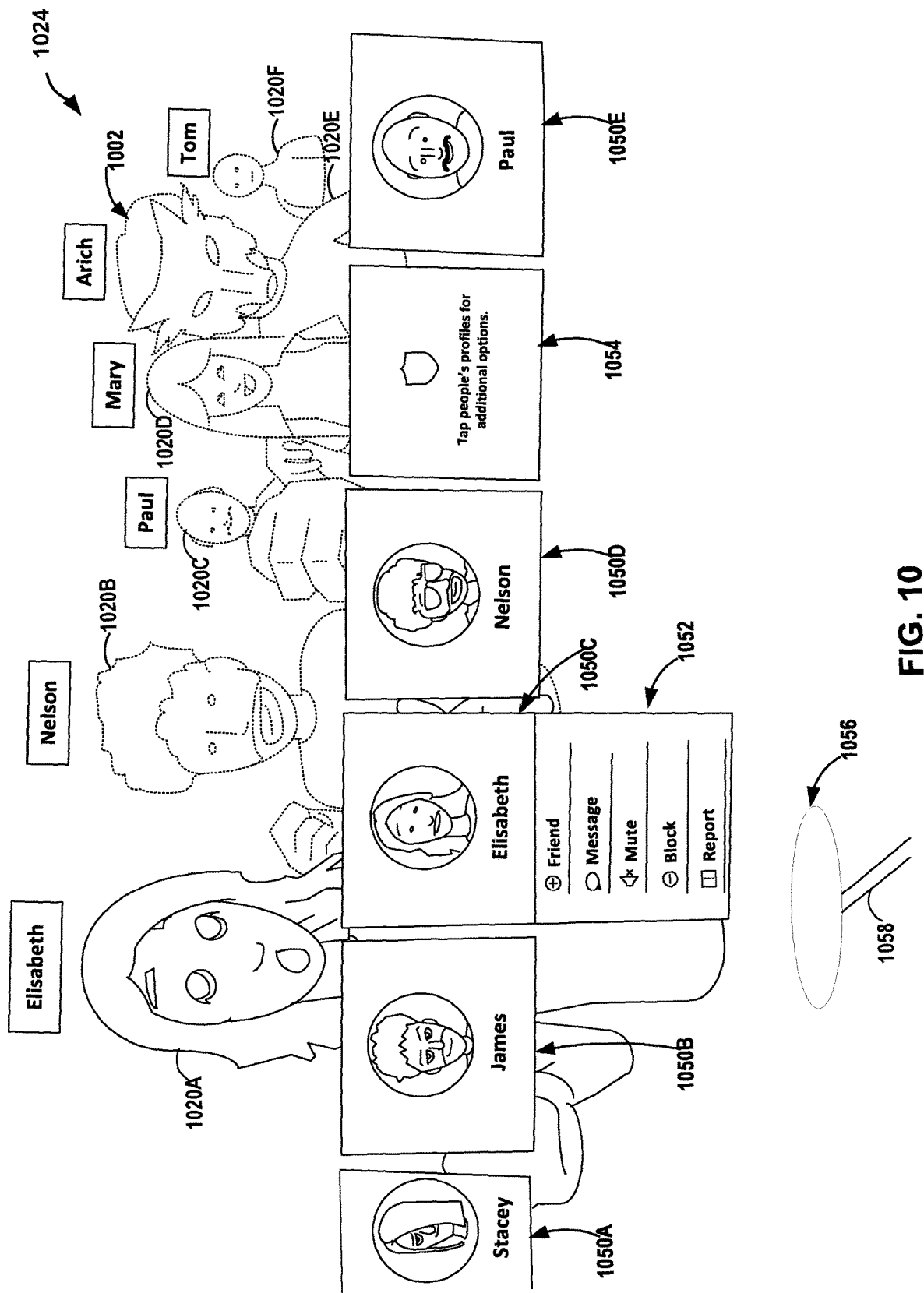
FIG. 10 is an illustration depicting an example of a suspend mode environment, in accordance with the techniques of this disclosure.

FIG. 10 is an illustration depicting an example suspend mode environment 1024, in accordance with the techniques of this disclosure. In the example illustrated in FIG. 10, suspend mode environment 1024 corresponds to artificial reality environment 924 in FIG. 9. That is, FIG. 10 is an example suspend mode environment 1024 that is displayed at HMD 112 after the user enabled the suspend mode feature while participating in artificial reality environment 924 of FIG. 9.

As shown in FIG. 10, suspend mode environment 1024 includes avatars 1020A, 1020B, 1020C, 1020D, 1020E, and 1020F (collectively, "avatars 1020") corresponding to avatars 920A, 920B, 920C, 920D, 920E, and 920F of FIG. 9, respectively. HMD 112 presents avatars 1020 in static poses (e.g., position and orientation) corresponding to the poses that avatars 1020 where in when the user of HMD 112 enabled the suspend mode feature. While avatars 1020 are presented in a static pose in suspend mode environment 1024 at HMD 112, avatars 920 may continue to participate in artificial environment 924 of FIG. 9. HMD 112 may continue to receive data regarding artificial reality environment 924 including pose information for each of avatars 920 while the suspend mode feature is enabled. That is, artificial reality environment 924 is not paused or otherwise stopped for avatars 920 when the user of HMD 112 enters suspend mode environment 1024. Notably, HMD 112 does not display the virtual background of artificial environment 924 (including virtual objects 928) in suspend mode environment 1024, and instead presents a different background (e.g., a solid-color background). For example, suspend mode environment 1024 does not include virtual objects 928 or virtual handheld object 914 of FIG. 9. Notably, HMD 112 will not display any avatars in suspend mode environment 1024 that were behind (e.g., obstructed by) virtual objects 928 in artificial reality environment 924. In some examples, HMD 112 continues to present costume, mask, or accessories of avatars 920. For example, HMD 112 will present avatar 1020E with mask 1002, which correspond to avatar 920E and mask 902 in FIG. 9. In some examples, avatars 1020 may include a graphic element with the first name of the corresponding users to some of the avatars 920. In other examples, these graphics may additionally or alternatively include a game score, remaining life, or any other information about the corresponding user. In some examples, this graphic element may not be included in artificial reality environment 924 but may be included in suspend mode environment 1024. In some examples, this graphic element may not be included in suspend mode environment 1024.

HMD 112 may further display a plurality of virtual UI elements corresponding to the one or more avatars that were in virtual reality environment 924 when the user enabled the suspend mode feature. For example, suspend mode environment 1024 includes UI elements 1050A, 1050B, 1050C, 1050D, and 1050 (collectively, "UI elements 1050" or "information panels 1050"). Each of UI elements 1050 may include a picture, name, or any other information corresponding to the respective user of the avatar, as shown in FIG. 10. In some examples, UI elements 1050 may include one or more UI elements for avatars not currently visible in suspend mode environment 1024. For example, an avatar is not visible corresponding to UI element 1050A in FIG. 10. This avatar may not be visible because she is not in the line of sight of HMD 112, she is was behind a virtual object or another avatar, or she was "away" when the user of HMD 112 enabled the suspend mode feature. HMD 112 may also present UI element 1054 with instructions, additional information, and/or a virtual UI element to exit suspend mode environment 1024 and return to artificial reality environment 924. In the example shown in FIG. 10, UI element 1054 indicates that the user of HMD 112 may tap a user profile (e.g., any of UI elements 1050) for additional options. In this example, the user has selected avatar 1020A by tapping on UI element 1050C. In some examples, a user of HMD 112 may select an avatar 1020 by looking at the avatar or pointing to them. In some examples, a user of HMD 112 may select an avatar 1020 with a voice selection, including verbally describing the avatar' physical appearance (e.g., describing the avatar's size, clothing, accessories, or any other distinctive characteristics) or saying the avatar's name, for example. In this way, a user need not scroll through various UI elements 1050 looking for a particular avatar/ user. In some examples, HMD 112 may visually mute the avatars 1050 until they are selected. For example, avatars 1020B-1020F may be presented in greyscale or otherwise differently than in artificial reality environment 924 (represented by dotted lines in FIG. 10). HMD 112 may also highlight and/or present selected avatar 1020A in true color (e.g., as in artificial reality environment 924). For example, HMD 112 may present a spotlight or base 1056 under avatar 1020A and present a line 1058 from the user of HMD 112 to base 1056. Base 1056 and line 1058 may move between avatars 1020 as the user selects different avatars 1020.

In response to selecting user 1020A, HMD 112 renders suspend mode UI 1052 comprising selectable virtual elements that allow the user to engage with that user through suspend mode UI 1052. For example, the user may friend, message, mute, block, and/or report user 1020A by selecting the corresponding virtual element in suspend mode UI 1052. In some examples, suspend mode UI 1052 may include a virtual UI element to exit suspend mode environment 1024 and return to artificial reality environment 924.

In some examples, blocking is performed at a network or server level (e.g., by artificial reality application engine 334 as described with reference to FIG. 3) and muting is performed at the HMD level (e.g., by suspend mode engine 432 as described with reference to FIG. 4). For example, if the user blocks user 1020A on the network, user 1020A will be unable to see or otherwise interact with the user in artificial reality environment 924 (or in any other artificial reality environment or application), to search for the user on the network, to message the user, or friend the user after the user exits the suspend mode environment. In some examples, the user may indicate whether to block user 902 immediately, after the completion of the current artificial reality application (e.g., the completion of a game), or when the user exits artificial reality environment 924. In some examples, the user of HMD 112 may indicate to mute the other user within the artificial reality environment and block that other user when the user of HMD 112 exits the artificial reality environment (e.g., mute the other user during the current game and block them once the game terminates). In some examples, blocked users will be unable to see, hear, or otherwise interact with the user and/or his avatar. For example, referring back to FIG. 9, if the user of HMD 112 blocks avatar 920A and avatar 920B later talks to the user of HMD 112 when the user returns to artificial reality environment 924, avatar 920B will appear, from the perspective of the blocked user corresponding to avatar 920A, to be speaking to no one.

If the user mutes another user, the user will be unable to hear audio coming from that other user while in artificial reality environment 924 because HMD 112 will mute the audio coming from that other user. If the user of HMD 112 reports another user, console 106 (or any other device from the artificial reality system) will flag the user for review by a review entity associated with the artificial reality environment or application. In some examples, artificial reality system may record interactions between the user of HMD 112 and the other user within artificial reality environment 924 for review.

While avatars 920 will continue to participate in artificial reality environment 924 while the suspend mode feature is enabled at HMD 112, the avatar corresponding to the user of HMD 112 will be disabled in artificial reality environment 924 and avatars 920 of FIG. 9 will be unable to view or interact with the avatar corresponding to the user of HMD 112. Instead, the users corresponding to avatars 920 may see a graphic similar to indication 904 of FIG. 9 indicating that the user of HMD 112 is not available without indicating that the user enabled the suspend mode. In some examples, the user of HMD 112 may be unable to participate in artificial reality environment 924. In some examples, the user of HMD 112 may be unable to photograph or record avatars 1020 within suspend mode environment 1024. Because a user's avatar may represent an extension of the user (e.g., the user's agent or persona in the artificial reality environment) the suspend mode feature can help ensure that the other users do not photograph, record, or interact with the user's avatar without the user's knowledge or consent while the suspend mode feature is activated, and vice versa.

While the user is in the suspend mode environment 1024, network communications between HMDs of the users in the artificial reality environment (including the HMD of the user in the Mode) continue. For example, HMD 112 will continue to receive updates regarding artificial reality application, artificial reality environment, and/or the other avatars from other HMDs. In this way, the user may take a break from the artificial reality application and later immediately reenter artificial reality environment 1024 in the artificial reality application's current state. Because the artificial reality application continued while the user was in suspend mode environment 1024, any of avatars 920 may be located in different location and/or may have exited the artificial reality environment 924 by the time the user exits the suspend mode environment 1024 and reenters the artificial reality environment 924. HMD 112 would be immediately be able to display the updated poses of avatars 920 because HMD 112 would not have a backlog of updates to process as it would have already processed those updates while the suspend mode was enabled.

It should be understood that the suspend mode feature is different than a pause mode. For example, in the suspend mode environment, the user of HMD 112 may be unable to access or update artificial reality application settings or preferences. As another example, the avatar for the user of HMD 112 may be replaced with a virtual graphic (e.g., virtual graphic 904 of FIG. 9) in artificial reality environment 924 while avatars 920 continue to participate artificial reality environment 924. In this way, avatars 920 may not interact with the avatar of HMD 112 (and vice versa) while the suspend mode feature is enabled at HMD 112.

Figure 11:
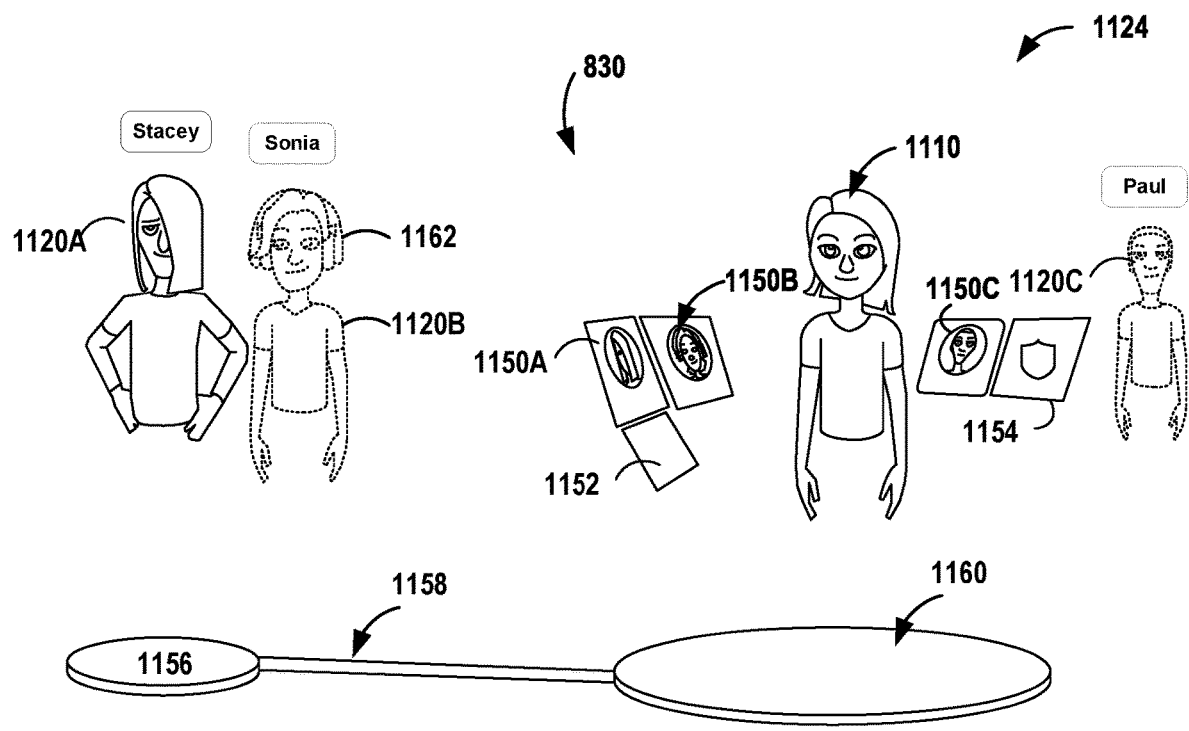
FIG. 11 is an illustration depicting another example of a suspend mode environment, in accordance with the techniques of this disclosure.

FIG. 11 is an illustration depicting another example of suspend mode environment 1124, in accordance with the techniques of this disclosure. In the example shown in FIG. 11, suspend mode environment 1124 is shown from different perspective than suspend mode environment 1024 of FIG. 10. In particular, suspended mode environment 1124 is shown from a third person perspective in FIG. 11. Suspend mode environment 1124 includes avatar 1110 corresponding to the user of HMD 112 and avatars 1120A, 1120B, and 1120C (collectively, "avatars 1120") corresponding to other users in the artificial reality environment. Similar to FIG. 10, HMD 112 presents avatars 1020 in static poses in suspend mode environment 1124. As shown in FIG. 11, avatar 1110 may be presented over platform or base 1160.

In some examples, HMD 112 will move one or more avatars 1120 away from avatar 1110 when the one or more avatars 1120 are within a personal space threshold from avatar 1110 (e.g., within one or two meters), as described above with reference to FIG. 7. In some examples, avatar 1110 may be able to rotate his field of view while in the suspend mode environment but will be unable to move from its current location within suspend mode environment 1124. For example, avatar 1110 may turn around 360 degrees and look up and down but cannot walk to another location within suspend mode environment 1124. In some examples, avatar 1110 may move about within the radius platform 1160 within the suspend mode environment. In some examples, only the avatars that were in a 360-degree line of sight from avatar 1110 at the time that the user of HMD 112 enabled the suspend mode feature will be rendered in the suspend mode environment. For example, avatars 1120 that are at a higher level/elevation (e.g., on a virtual mountain top or on any other virtual object) or at a lower level/elevation (e.g., on the bottom of a virtual ditch) but were within a 360-degree line of sight from avatar 1110 (even though the user may not have been looking at the avatar) at the time the user enabled the suspend mode feature will be displayed when that avatar is within the HMD's field of view within suspend mode environment 1124. An avatar for another user that was behind a virtual wall or otherwise obstructed by a virtual object may not be rendered in suspend mode environment 1124. In some examples, HMD 112 may continue to render garments and accessories of avatars 1120 in suspend mode environment 1124, including clothing, headgear, shoes, costume elements, or any other elements that make up the avatars' persona. For example, HMD 112 may continue to render the virtual headphones 1162 on avatar 1120B. In this way, the user may more easily identify each of avatars 1120 within the suspend mode environment 1124.

While in suspend mode environment 1124, avatar 1110 may select any of avatars 1120 by performing a selection gesture on any of UI elements 1150A, 1150B, or 1150C (collectively, "UI elements 1150") to perform additional operations (e.g., as described with reference to UI elements 1050 in FIG. 10). For example, when avatar 1110 selects (e.g., through a touch gesture) one of UI elements 1150, HMD 112 renders a virtual suspend mode UI 1152. When an avatar is selected, HMD 112 highlights the selected avatar and/or deemphasizes the other avatars (e.g., greys them out). For example, avatar 1110 may select avatar 1120A and HMD 112 may render a spotlight or base 1156 under avatar 1120A and present a line 1158 from platform 1160 to base 1056. Base 1056 and line 1058 may move between avatars 1120 as the user selects different avatars 1020. Additionally or alternatively, HMD 112 deemphasizes unselected avatars 1120B and 1120C by, for example, greying or fading them out (represented as dotted lines in FIG. 11).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality VR, an augmented reality AR, a mixed reality MR, a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example, and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example, and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example, and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example, and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example, and not by way of limitation, a first user may view one or more second users of an online social network through a "People You May Know" function of the online social network, or by viewing a list of friends of the first user. As an example, and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example, and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example, and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example, and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example, and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example, and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

What is claimed is:

1. An artificial reality system comprising:
a head-mounted display (HMD) configured to output artificial reality content to a user of the HMD, wherein the artificial reality content includes one or more avatars corresponding to one or more other users participating in an artificial reality environment; and
a suspend mode engine configured to, in response to user input, enable a suspend mode environment for the user of the HMD in which an avatar corresponding to the user stops participating in the artificial reality environment and the one or more avatars corresponding to the one or more other users continue participating in the artificial reality environment at respective HMDs of the one or more other users, wherein the suspend mode engine at least:
renders the one or more avatars in static positions within the suspend mode environment at the HMD of the user while the one or more avatars corresponding to the one or more other users continue participating in the artificial reality environment at the respective HMDs of the one or more other users.

2. The artificial reality system of claim 1, further comprising:
an image capture device configured to capture image data representative of a physical environment;
a gesture detector configured to identify, from the image data, a user interface (UI) activation gesture comprising moving an inside wrist area of a hand of the user of the HMD in a field of view of the image capture device;
a UI engine configured to, in response to the UI activation gesture, generate a suspend mode UI element; and
a rendering engine configured to render the suspend mode UI element near or at least partially over the hand of the user.

3. The artificial reality system of claim 2, wherein the user input corresponds to a suspend mode selection gesture comprising placement of one or more fingers of a virtual hand of an avatar of the user on the suspend mode UI element, and the gesture detector is further configured to identify, from the image data, the suspend mode selection gesture.

4. The artificial reality system of claim 1, wherein the suspend mode engine is further configured to move the one or more avatars away from the avatar corresponding to the user when the one or more avatars are within a personal space threshold from the avatar corresponding to the user in response to the suspend mode environment being enabled.

5. The artificial reality system of claim 1, wherein the suspend mode engine is further configured to replace a virtual background and virtual objects within the artificial reality environment with a solid-color background in the suspend mode environment.

6. The artificial reality system of claim 1, wherein the suspend mode engine is further configured to play background music in the suspend mode environment.

7. The artificial reality system of claim 1, wherein at least one of the respective HMDs renders a virtual graphic corresponding to the user of the HMD after the suspend mode environment is enabled for the user at the HMD.

8. The artificial reality system of claim 1, wherein at least one user of the other users of the respective HMDs is unable to interact with the avatar corresponding to the user of the HMD within the artificial reality environment after the suspend mode environment is enabled for the user at the HMD.

9. The artificial reality system of claim 1,
wherein the HMD comprises a first HMD and the user of the first HMD comprises a first user;
wherein the user input comprises a first user input and the suspend mode environment comprises a first suspend mode environment;
wherein the suspend mode engine is further configured to, in response to a second user input from a second user of the other users participating in the artificial reality environment, enable a second suspend mode environment for the second user of a second HMD of the respective HMDs that is different from the first suspend mode environment; and
wherein the second user of the second HMD is unable to interact with the avatar of the first user within the first suspend mode environment or the second suspend mode environment.

10. The artificial reality system of claim 1, wherein the suspend mode engine is further configured to:
render a user interface (UI) element for each of the one or more avatars within the suspend mode environment, wherein each UI element is selectable via a selection gesture performed by the user; and
in response to detecting the selection gesture of a first UI element corresponding to a first avatar of the one or more avatars, at least one of:
render a first selectable virtual element configured to, when selected, mute the first avatar at the HMD when the user returns to the artificial reality environment,
render a second selectable virtual element configured to, when selected, block the first avatar and an avatar of the user from interacting when the user returns to the artificial reality environment, or
render a third selectable virtual element configured to, when selected, report the first avatar to a review entity associated with the AR experience.

11. The artificial reality system of claim 10, wherein the first avatar is highlighted when the first UI element corresponding to the first avatar is selected.

12. The artificial reality system of claim 10, wherein the first avatar will be unable to interact with the avatar of the user in the artificial reality environment or any other artificial reality environment if blocked by the user, whether or not the suspend mode environment is enabled for the user.

13. A method comprising:
outputting, at a head mounted display (HMD) of an artificial reality system, artificial reality content to a user of the HMD, wherein the artificial reality content includes one or more avatars corresponding to one or more other users participating an artificial reality environment; and
in response to user input, enabling a suspend mode environment for the user of the HMD in which an avatar corresponding to the user stops participating in the artificial reality environment and the one or more avatars corresponding to the one or more other users continue participating in the artificial reality environment at respective HMDs of the one or more other users, and wherein enabling the suspend mode environment for the user of the HMD comprises at least:
rendering the one or more avatars in static positions within the suspend mode environment at the HMD of the user while the one or more avatars corresponding to the one or more other users continue participating in the artificial reality environment at the respective HMDs of the one or more other users.

14. The method of claim 13, further comprising:
obtaining, by the artificial reality system, image data via an image capture device;
identifying, from the image data, a user interface (UI) activation gesture comprising moving an inside wrist area of a hand of the user of the HMD in a field of view of the image capture device;
in response to the UI activation gesture, generating a suspend mode UI element; and
rendering the suspend mode UI element near or at least partially over the hand of the user.

15. The method of claim 14,
wherein the user input corresponds to a suspend mode selection gesture comprising placement of one or more fingers of a virtual hand of an avatar of the user on the suspend mode UI element, and
the method further comprises identifying, from the image data, the suspend mode selection gesture.

16. The method of claim 13, wherein the suspend mode engine is further configured to replace a virtual background and virtual objects within the artificial reality environment with a solid-color background in the suspend mode environment.

17. The method of claim 13 wherein enabling the suspend mode environment further includes moving the one or more avatars away from the avatar corresponding to the user when the one or more avatars are within a personal space threshold from the avatar corresponding to the user in response to the suspend mode environment being enabled.

18. A non-transitory computer-readable storage medium comprising instructions that configure one or more programmable processors to:
output, at head mounted display (HMD) of an artificial reality system, artificial reality content to a user of the HMD, wherein the artificial reality content includes one or more avatars corresponding to one or more other users participating an artificial reality environment; and in response to user input, enable a suspend mode environment for the user of the HMD in which an avatar corresponding to the user stops participating in the artificial reality environment and the one or more avatars corresponding to the one or more other users continue participating in the artificial reality environment at respective HMDs of the one or more other users, and wherein the instructions that configure the one or more programmable processors to enable the suspend mode environment for the user of the HMD further configure the one or more programmable processors to at least:

render the one or more avatars in static positions within the suspend mode environment at the HMD of the user while the one or more avatars corresponding to the one or more other users continue participating in the artificial reality environment at the respective HMDs of the one or more other users.

19. The artificial reality system of claim 1, wherein, in addition to rendering the one or more avatars in static positions within the suspend mode environment at the HMD of the user, the suspend mode engine at least one of:
- replaces the artificial reality environment with the suspend mode environment at the HMD of the user, or
- mutes the one or more avatars and the artificial reality environment at the HMD of the user.

20. The method of claim 13, wherein, in addition to rendering the one or more avatars in static positions within the suspend mode environment at the HMD of the user, enabling the suspend mode environment for the user of the HMD comprises at least one of:
- replacing the artificial reality environment with the suspend mode environment at the HMD of the user, or
- muting the one or more avatars and the artificial reality environment at the HMD of the user.

* * * * *